United States Patent
Hatasaki et al.

(10) Patent No.: US 8,407,514 B2
(45) Date of Patent: *Mar. 26, 2013

(54) METHOD OF ACHIEVING HIGH RELIABILITY OF NETWORK BOOT COMPUTER SYSTEM

(75) Inventors: Keisuke Hatasaki, Kawasaki (JP); Takao Nakajima, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/114,894

(22) Filed: May 24, 2011

(65) Prior Publication Data

US 2011/0225449 A1    Sep. 15, 2011

Related U.S. Application Data

(63) Continuation of application No. 12/941,191, filed on Nov. 8, 2010, now Pat. No. 7,966,515, which is a continuation of application No. 12/433,618, filed on Apr. 30, 2009, now Pat. No. 7,840,835, which is a continuation of application No. 11/580,415, filed on Oct. 13, 2006, now Pat. No. 7,533,288.

(30) Foreign Application Priority Data

Apr. 21, 2006  (JP) ................................ 2006-117822

(51) Int. Cl.
    *G06F 11/00* (2006.01)
(52) U.S. Cl. ........................................ 714/4.1
(58) Field of Classification Search ............... 714/2, 4.1, 714/4.11, 4.2, 4.21, 4.3, 4.4, 4.5, 6.2, 6.3, 714/13, 15, 16
See application file for complete search history.

(56) References Cited

U.S. PATENT DOCUMENTS

| | | | |
|---|---|---|---|
| 5,633,999 A | 5/1997 | Clowes et al. | |
| 5,774,640 A | 6/1998 | Kurio | |
| 5,822,512 A * | 10/1998 | Goodrum et al. | 714/13 |
| 5,996,086 A | 11/1999 | Delaney et al. | |
| 6,148,410 A | 11/2000 | Baskey et al. | |
| 6,557,114 B2 | 4/2003 | Mann et al. | |
| 6,594,775 B1 | 7/2003 | Fair | |
| 6,718,481 B1 | 4/2004 | Fair | |
| 7,099,901 B2 | 8/2006 | Sutoh et al. | |
| 7,103,807 B2 | 9/2006 | Bosa et al. | |
| 7,107,481 B2 | 9/2006 | Baba | |
| 7,216,258 B2 | 5/2007 | Ebsen et al. | |
| 7,240,234 B2 | 7/2007 | Morita et al. | |
| 7,251,745 B2 | 7/2007 | Koch et al. | |

(Continued)

FOREIGN PATENT DOCUMENTS

| | | |
|---|---|---|
| JP | 2000-047894 | 2/2000 |
| JP | 2002-215474 | 8/2002 |

(Continued)

*Primary Examiner* — Nadeem Iqbal
(74) *Attorney, Agent, or Firm* — Kilpatrick Townsend & Stockton LLP

(57) ABSTRACT

In a network computer system, recovery may be impossible from a fault when the fault occurs in a network switch in a network or a device such as an external disk device. Provided is a computer system that includes a plurality of servers, a plurality of network, a plurality of external disk devices, and a management computer, in which the management computer detects a fault which is occurred, retrieves an application stop server inaccessible to the used disk due to the fault, retrieves the disk for storing the same contents as contents stored in the disk used by the retrieved application stop server and the external disk device including the disk, retrieves an application resuming server capable of accessing the retrieved external disk device, and transmits an instruction to boot by using the retrieved disk to the retrieved application resuming server.

20 Claims, 33 Drawing Sheets

U.S. PATENT DOCUMENTS

| | | |
|---|---|---|
| 7,266,758 B2 | 9/2007 | Takeuchi et al. |
| 7,337,234 B2 | 2/2008 | Hu et al. |
| 7,401,254 B2 | 7/2008 | Davies |
| 7,418,564 B2 | 8/2008 | Suzuki |
| 7,533,288 B2 * | 5/2009 | Hatasaki et al. ............ 714/4.4 |
| 7,590,727 B1 | 9/2009 | Barnes |
| 7,685,281 B1 * | 3/2010 | Saraiya et al. ............ 709/226 |
| 7,770,061 B2 | 8/2010 | Qutub et al. |
| 7,840,835 B2 * | 11/2010 | Hatasaki et al. ............ 714/4.1 |
| 7,941,694 B1 * | 5/2011 | Gardner et al. ............ 714/6.12 |
| 7,966,515 B2 * | 6/2011 | Hatasaki et al. ............ 714/4.1 |
| 2003/0217310 A1 | 11/2003 | Ebsen et al. |
| 2003/0237018 A1 | 12/2003 | Baba |
| 2004/0019615 A1 | 1/2004 | Sutoh et al. |
| 2005/0144505 A1 | 6/2005 | Takeuchi et al. |
| 2005/0246568 A1 | 11/2005 | Davies |
| 2005/0268148 A1 | 12/2005 | Matsubara et al. |
| 2006/0106819 A1 | 5/2006 | Dhanadevan et al. |
| 2007/0180452 A1 * | 8/2007 | Hirayama et al. ............ 718/105 |

FOREIGN PATENT DOCUMENTS

| | | |
|---|---|---|
| JP | 2005-346204 A | 12/2005 |

* cited by examiner

SERVER INFORMATION TABLE 306

| SERVER (401) | STATE (402) | USED DISK (403) | PATH BEING USED (404) | ADAPTOR (405) | NW-SW OF CONNECTION DESTINATION (406) | EXTERNAL DISK DEVICE OF CONNECTION DESTINATION (407) | CONTROLLER OF CONNECTION DESTINATION (408) |
|---|---|---|---|---|---|---|---|
| S0 | BEING OPERATED | D0 | YES | WWN0 | SW0 | ARRAY0 | CTRL0 |
|  |  |  | NO |  |  | ARRAY1 | CTRL0 |
| S1 | BEING OPERATED | D1 | YES | WWN1 | SW0 | ARRAY0 | CTRL0 |
|  |  |  | NO |  |  | ARRAY1 | CTRL0 |
| S2 | STOPPED CHANGE TO S7 | D2 | YES | WWN2 | SW0 | ARRAY0 | CTRL0 |
|  |  |  | NO |  |  | ARRAY1 | CTRL0 |
| S3 | STANDING-BY | - | NO | WWN3 | SW0 | ARRAY0 | CTRL0 |
|  |  |  | NO |  |  | ARRAY1 | CTRL0 |
| S4 | BEING OPERATED | D4 | NO | WWN4 | SW1 | ARRAY0 | CTRL1 |
|  |  |  | YES |  |  | ARRAY1 | CTRL1 |
| S5 | BEING OPERATED | D5 | YES | WWN5 | SW1 | ARRAY0 | CTRL1 |
|  |  |  | NO |  |  | ARRAY1 | CTRL1 |
| S6 | STANDING-BY | - | NO | WWN6 | SW1 | ARRAY0 | CTRL1 |
|  |  |  | NO |  |  | ARRAY1 | CTRL1 |
| S7 | BEING OPERATED CHANGE FROM S2 | D2 | NO | WWN7 | SW1 | ARRAY0 | CTRL1 |
|  |  |  | YES |  |  | ARRAY1 | CTRL1 |

FIG. 4

EXTERNAL DISK DEVICE INFORMATION TABLE 307

| EXTERNAL DISK DEVICE (501) | CONTROLLER (502) | PORT (503) |
|---|---|---|
| ARRAY0 | CTRL0 | WWPN0 |
| | CTRL1 | WWPN1 |
| ARRAY1 | CTRL0 | WWPN2 |
| | CTRL1 | WWPN3 |

*FIG. 5*

REDUNDANT PATH INFORMATION TABLE 323

| DISK IMAGE | EXTERNAL DISK DEVICE | DISK | CON-TROLLER | LOGICAL DISK | SYNCHRO-NOUS EXTERNAL DISK DEVICE | SYNCHRO-NOUS DISK | CON-TROLLER | LOGICAL DISK |
|---|---|---|---|---|---|---|---|---|
| D0 | ARRAY0 | VOL0 | CTRL0 | LUN0 | ARRAY1 | SVOL0 | CTRL0 | LUN10 |
|    |        |      | CTRL1 | LUN0 |        |       | CTRL1 | LUN10 |
| D1 | ARRAY0 | VOL1 | CTRL0 | LUN1 | ARRAY1 | SVOL1 | CTRL0 | LUN11 |
|    |        |      | CTRL1 | LUN1 |        |       | CTRL1 | LUN11 |
| D2 | ARRAY0 | VOL2 | CTRL0 | LUN2 | ARRAY1 | SVOL2 | CTRL0 | LUN12 |
|    |        |      | CTRL1 | LUN2 |        |       | CTRL1 | LUN12 |
| D4 | ARRAY1 | VOL4 | CTRL0 | LUN4 | ARRAY0 | SVOL4 | CTRL0 | LUN14 |
|    |        |      | CTRL1 | LUN4 |        |       |       |       |
| D5 | ARRAY1 | VOL5 | CTRL0 | LUN5 | ARRAY0 | SVOL5 | CTRL0 | LUN15 |
|    |        |      | CTRL1 | LUN5 |        |       | CTRL1 | LUN15 |

LOGICAL DISK TABLE

| DISK (801) | LOGICAL DISK (802) |
|---|---|
| VOL0 | LUN0 |
| VOL1 | LUN1 |
| VOL 2 | LUN2 |
| SVOL 4 | LUN14 |
| SVOL 5 | LUN15 |

*FIG. 8*

SYNCHRONOUS DISK TABLE

| DISK | EXTERNAL DISK DEVICE OF SYNCHRONIZATION DESTINATION | SYNCHRONOUS DISK |
|---|---|---|
| VOL0 | ARRAY1 | SVOL0 |
| VOL1 | ARRAY1 | SVOL1 |
| VOL2 | ARRAY1 | SVOL2 |

*FIG. 10*

SERVER INFORMATION TABLE 306

| SERVER (401) | STATE (402) | USED DISK (403) | PATH BEING USED (404) | ADAPTOR (405) | NW-SW OF CONNECTION DESTINATION (406) | (407) | (408) | ADAPTOR CONNECTION SW PORT (410) |
|---|---|---|---|---|---|---|---|---|
| S0 | BEING OPERATED | D0 | YES | WWN0 | SW0 | | | 0 |
| | | | NO | | | | | |
| S1 | BEING OPERATED | D1 | YES | WWN1 | SW0 | | | 1 |
| | | | NO | | | | | |
| S2 | STOPPED CHANGE TO S7 | D2 | YES | WWN2 | SW0 | | | 2 |
| | | | NO | | | | | |
| S3 | STANDING-BY | - | NO | WWN3 | SW0 | | | 3 |
| | | | NO | | | ......... | | |
| S4 | BEING OPERATED | D4 | NO | WWN4 | SW1 | | | 0 |
| | | | YES | | | | | |
| S5 | BEING OPERATED | D5 | YES | WWN5 | SW1 | | | 1 |
| | | | NO | | | | | |
| S6 | STANDING-BY | - | NO | WWN6 | SW1 | | | 2 |
| | | | NO | | | | | |
| S7 | BEING OPERATED CHANGE FROM S2 | D2 | NO | WWN7 | SW1 | | | 3 |
| | | | YES | | | | | |

*FIG. 25*

EXTERNAL DISK DEVICE INFORMATION TABLE 307

| EXTERNAL DISK DEVICE | CONTROLLER | PORT | NW-SW OF CONTROLLER CONNECTION DESTINATION | SW PORT OF CONTROLLER CONNECTION |
|---|---|---|---|---|
| ARRAY0 | CTRL0 | WWPN0 | SW0 | 10 |
|  | CTRL1 | WWPN1 | SW1 | 10 |
| ARRAY1 | CTRL0 | WWPN2 | SW0 | 11 |
|  | CTRL1 | WWPN3 | SW1 | 11 |

*FIG. 26*

SECURITY TABLE 142

METHOD OF ACHIEVING HIGH RELIABILITY OF NETWORK BOOT COMPUTER SYSTEM

CROSS-REFERENCES TO RELATED APPLICATIONS

This application is a continuation application of U.S. patent application Ser. No. 12/941,191, filed on Nov. 8, 2010, which is a continuation application of U.S. patent application Ser. No. 12/433,618, filed on Apr. 30, 2009, which is a continuation of U.S. patent application Ser. No. 11/580,415, filed on Oct. 13, 2006, which in turn claims priority to Japanese Patent Application JP2006-117822, filed on Apr. 21, 2006, the contents of all of which are incorporated in their entirety for all purposes.

BACKGROUND OF THE INVENTION

This invention relates to a method of recovering an application when a fault occurs in a device included in a network boot server computer system.

There is made available a network boot computer system in which each server boots by reading a program of an operating system (OS) or the like from a disk of an external disk device in an environment having a plurality of servers connected to the external disk device via a network. In the network boot computer-system, the plurality of servers are connected to the external disk device via the network and a network switch. Thus, a boot disk referred to by a certain server can be referred to by another server.

Regarding the network boot computer system, a fault recovery method of taking over an application of a faulted server to another server has been disclosed. To be specific, when a fault occurs in the server being operated, another server not being operated uses a boot disk of the external disk device used by the server to be booted. As a result, the application of the faulted server is taken over by another server (e.g., JP 2002-215474 A and JP 2000-47894 A).

BRIEF SUMMARY OF THE INVENTION

According to the fault recovery method, recovery can be made from a fault when the fault occurs in the server. However, when a fault occurs in the external disk device including the boot disk or in the network switch present in the network for interconnecting the server and the disk, fault recovery by the method is impossible. For example, in a case where the server engaged in an application and the server not engaged in an application are connected to the same network switch or external disk device, when a fault occurs in the network switch or the external disk device, neither of the servers can continue the application, causing both of the servers to go down together.

Thus, in the conventional network boot computer system, when a fault occurs in the network switch in the network or the external disk device, the server that should take over the boot disk may not be able to access the boot disk. In this case, the server cannot take over the application to recover from the fault.

This invention has been made to solve the foregoing problems, and it is an object of this invention to continue an application by recovering from a fault occurring in a network switch present in a network path or a device such as an external disk device in a network boot computer system.

According to a representative aspect of this invention, there is provided a method of controlling a computer system including a plurality of servers, a plurality of networks connected to the plurality of servers, a plurality of external disk devices connected to the plurality of networks, and a management computer connected to the plurality of servers, the plurality of networks, and the plurality of external disk devices via a management network, in which each of the external disk devices includes at least one disk for storing data, the management computer includes an interface connected to the management network, a first processor connected to the interface, and a first memory connected to the first processor. The method includes: detecting, by the first processor, an occurrence of a fault in any of the server, the network, and the external disk device; retrieving, by the first processor, an application stop server inaccessible to the used disk due to the fault among the plurality of servers; retrieving, by the first processor, a disk for storing the same contents as contents of the disk used by the retrieved application stop server among the plurality of disks, and the external disk device including the retrieved disk; retrieving, by the first processor, an application resuming server capable of accessing the retrieved external disk device via the network in which the fault is not occurred among the plurality of servers; and transmitting, by the first processor, an instruction of booting by using the retrieved disk to boot to the retrieved application resuming server via the management network.

According to one embodiment of this invention, in the network boot computer system, even when a fault occurs in the network switch present in the network path or the device such as the external disk device used by the server to boot, a server accessible to the boot disk through the network is always present in the network boot computer system. Then, the server takes over the boot disk to boot, making it possible to recover the application. Processing for recovering the application is automatically executed by the management computer, and a work load on the system manager can thus be reduced.

BRIEF DESCRIPTION OF THE DRAWINGS

The present invention can be appreciated by the description which follows in conjunction with the following figures, wherein:

FIG. 4 is an explanatory diagram showing a server information table according to the first embodiment of this invention;

FIG. 5 is an explanatory diagram showing an external disk device information table according to the first embodiment of this invention;

FIG. 6 is an explanatory diagram showing a redundant path 20 information table according to the first embodiment of this invention;

FIG. 8 is an explanatory diagram showing a logical disk table 25 according to the first embodiment of this invention;

FIG. 10 is an explanatory diagram showing a synchronous disk table 5 according to the first embodiment of this invention;

FIG. 25 is an explanatory diagram showing a server information table according to a fourth embodiment of this invention;

FIG. 26 is an explanatory diagram showing an external disk device information table according to the fourth embodiment of this invention;

DETAILED DESCRIPTION OF THE INVENTION

The preferred embodiments of this invention will be described below with reference to the drawings.

Figure 1:
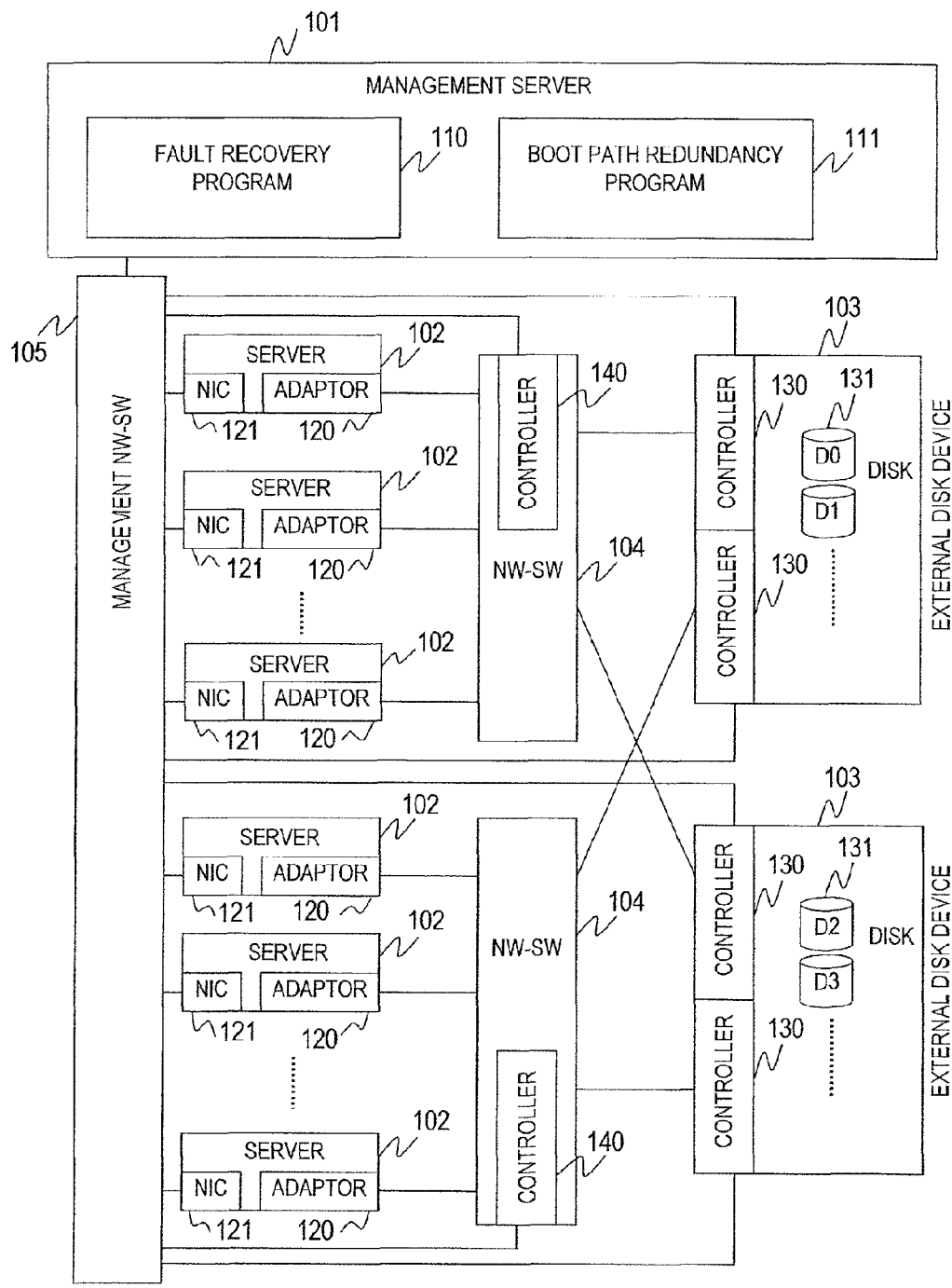
FIG. 1 is a block diagram showing a configuration of a computer system according to a first embodiment of this invention.

FIG. 1 is a block diagram showing a configuration of a computer 20 system according to a first embodiment of this invention.

The computer system of this embodiment includes a management server 101, a plurality of servers 102, a plurality of external disk devices 103, a plurality of network switches (NW-SW) 104, and a management network switch (management NW-SW) 105.

Each server 102 includes a network interface card (NIC) 121 connected to the management NW-SW 105, and a network adaptor (referred to as adaptor) 120 connected to the NW-SW 104.

The NW-SW 104 constitutes a network for interconnecting the server 102 and the external disk device 103. The NW-SW 104 may be a switch for handling Ethernet protocol, a switch of a fibre channel, or a network switch of another kind.

The management NW-SW 105 constitutes a network for interconnecting the management server 101, the server 102, the external disk device 103, and the NW-SW 104. As in the case of the NW-SW 104, the management NW-SW 105 may be a switch for handling Ethernet protocol, a switch of a fibre channel, or a network switch of another kind.

The NW-SW 104 is connected to a port (not shown) disposed in a controller 130 of the external disk device 103. In an example of FIG. 1, one port of each controller 130 is connected to the NW-SW 104. However, a plurality of ports of each controller 130 may be connected to the NW-SW 104. Alternatively, the adaptor 120 of the server 102 may be directly connected to the controller 130 without using the NW-SW 104.

The external disk device 103 includes one or more disks 131. The server 102 can access a disk 131 via the NW-SW 104 and the controller 130. The external disk device 103 may be, for example, a disk array device, a server for handling a network file system, or a server for handling iSCSI.

The controller 130 includes an information processor such as a CPU to control information input/output to/from the controller 130 and information recorded in the disk 131 in the external disk device 103. The external disk device 103 can include a plurality of controllers 130, and a certain controller 130 can operate without being affected by a fault of another controller 130. The disk 131 is an information storage device accessible from the serer 102 to read/write data.

The disk 131 is a storage volume (so-called logical volume) logically recognized as one information storage device. One disk 131 may be constituted of one physical disk drive or a plurality of physical disk drives. Alternatively, the disk 131 may be constituted of an information storage device (e.g., semiconductor storage device) other than the disk drive. The disk 131 may have a so-called RAID configuration.

The disk 131 records a program of an operating system (OS), an application, middleware, a driver or the like used by the server 102, and data, information of log, or the like used by the program. Data recorded in the disk 131 as described above will be referred to as a disk image hereinafter. In other words, the disk image indicates contents of the disk 131. In FIG. 1, the disk image is shown by a disk image identifier of D0, D1, or the like. When contents of a plurality of disks 131 are identical, disk images recorded in the disks 131 have identical disk image identifiers.

For example, when there are two disks 131 recording disk images whose identifiers are "D0", entire contents of the disks 131 are identical. In other words, data stored in one of the two disks 131 is always stored in the other disk 131.

The management NW-SW 105 is connected to a management server 101 for managing the computer system, a NIC 121 of the server 102, a management port (not shown) disposed in a controller 140 of the NW-SW 104, and a management port (not shown) disposed in the controller 130 of the external disk device 103. The controller 130 of the external disk device 103 can receive control of the external disk device 103 from the management server 101 via the management port. The controller 130 can notify a fault occurrence of the external disk device 103 to the management server 101 via the management port. The management port of the controller 140 of the NW-SW 104 can receive control of the NW-SW 104 from the management server 101. Additionally, the management port of the controller 140 can notify a fault occurrence of the NW-SW 104 to the management server 101.

The management server 101 includes a fault recovery program 110 and a boot path redundancy program 111. The fault recovery program 110 executes recovery processing from a fault when the fault occurs in a device disposed in the computer system. The boot redundancy program 111 makes redundant a network path for connecting the server 102 to the external disk device 103 used by the server 102 for booting (i.e., starting), and executes security setting. The management server 101 is, for example, a computer equipped with a CPU, a memory, a network card, and the like (refer to FIG. 33).

Figure 2:
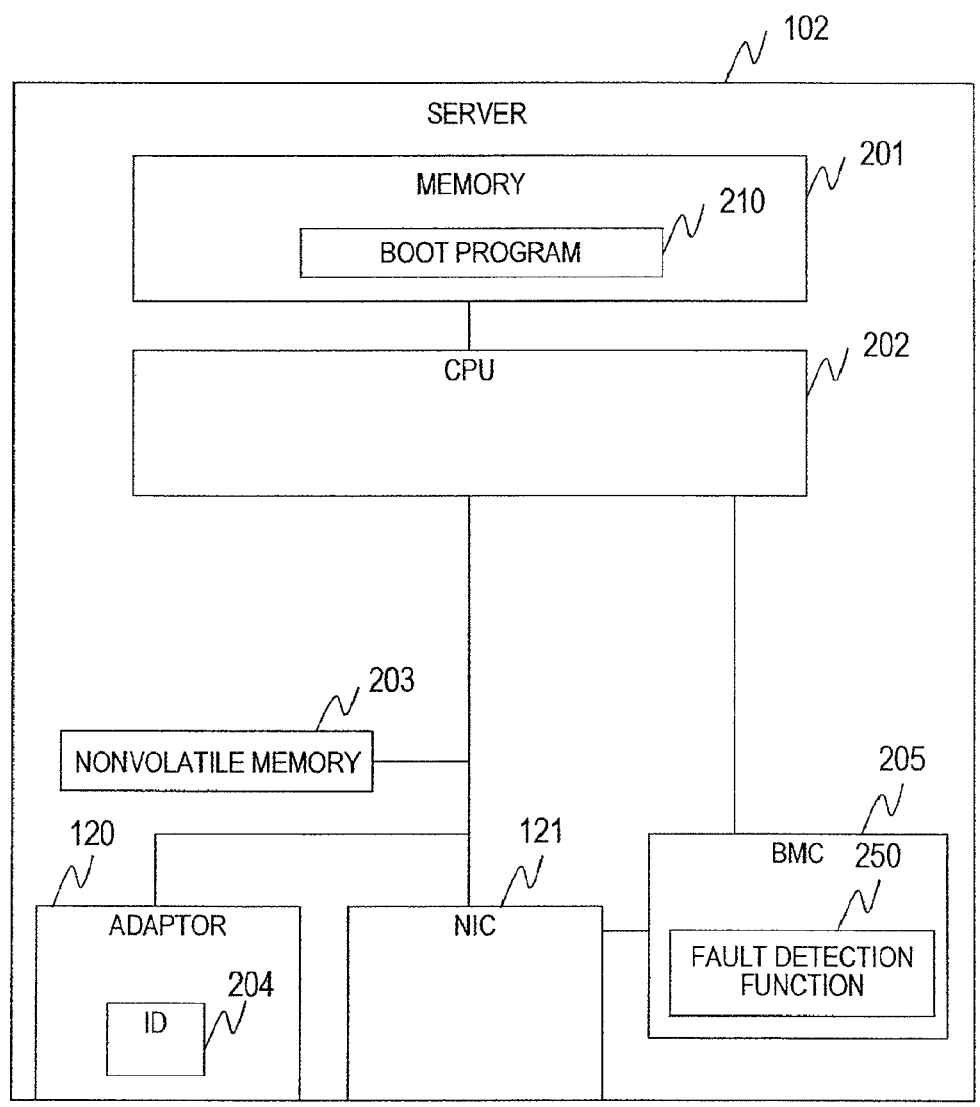
FIG. 2 is a block diagram showing a configuration of a server in detail according to the first embodiment of this invention.

FIG. 2 is s block diagram showing a configuration of the server 102 in detail according to the first embodiment of this invention.

The server 102 includes a memory 201, a CPU 202, a nonvolatile memory 203, an adaptor 120, a NIC 121, and a baseboard management controller (BMC) 205.

The memory 201 is, for example, a semiconductor memory, for storing a program and data. In the memory 201 of this embodiment, as a 25 program, a boot program 210 executed when the server 102 boots is stored.

The CPU 202 is a processor for executing the program stored in the memory 201.

A unique identifier (ID) 204 is stored in a memory (not shown) disposed in the adaptor 120. When the adaptor 120 is a network adaptor, the ID 204 is, for example, a MAC address or an IP address. When the adaptor 120 is a host bus adaptor of a fibre channel, the ID 204 is, for example, a world wide name (WWN).

The BMC 205 mainly monitors or controls hardware of the server 102. When a fault occurs in the hardware of the server 102, a fault detection function 250 can detect a fault to notify the fault to the outside of the computer system. Through the BMC 205, power can be turned ON or OFF for the sever 102 from a remote place. The fault detection function 250 may be a program stored in a memory (not shown) of the BMC 205 to be executed by a processor (not shown) of the BMC 205. Alternatively, the fault detection function 250 may be realized as a hardware logic.

The nonvolatile memory 203 is, for example, a nonvolatile memory such as an EEPROM or a hard disk drive. In the nonvolatile memory 203, a device used by the server 102 for booting is preregistered.

The boot program 210 is, for example, a program such as a system BIOS or an sEFI. This program is operated to boot the server 102 by using the device registered in the nonvolatile memory 203 when power is turned ON for the server 102. To be specific, the boot program 210 executes booting by reading the OS or the like from the disk 131 registered in the nonvolatile memory 203 via an access path registered in the nonvolatile memory 203. Further, the boot program 210 can execute network booting. The network booting means that the adaptor 120 receives a program from the network to execute booting. The network booting is, for example, executed based on a PXE protocol or the like.

Figure 33:
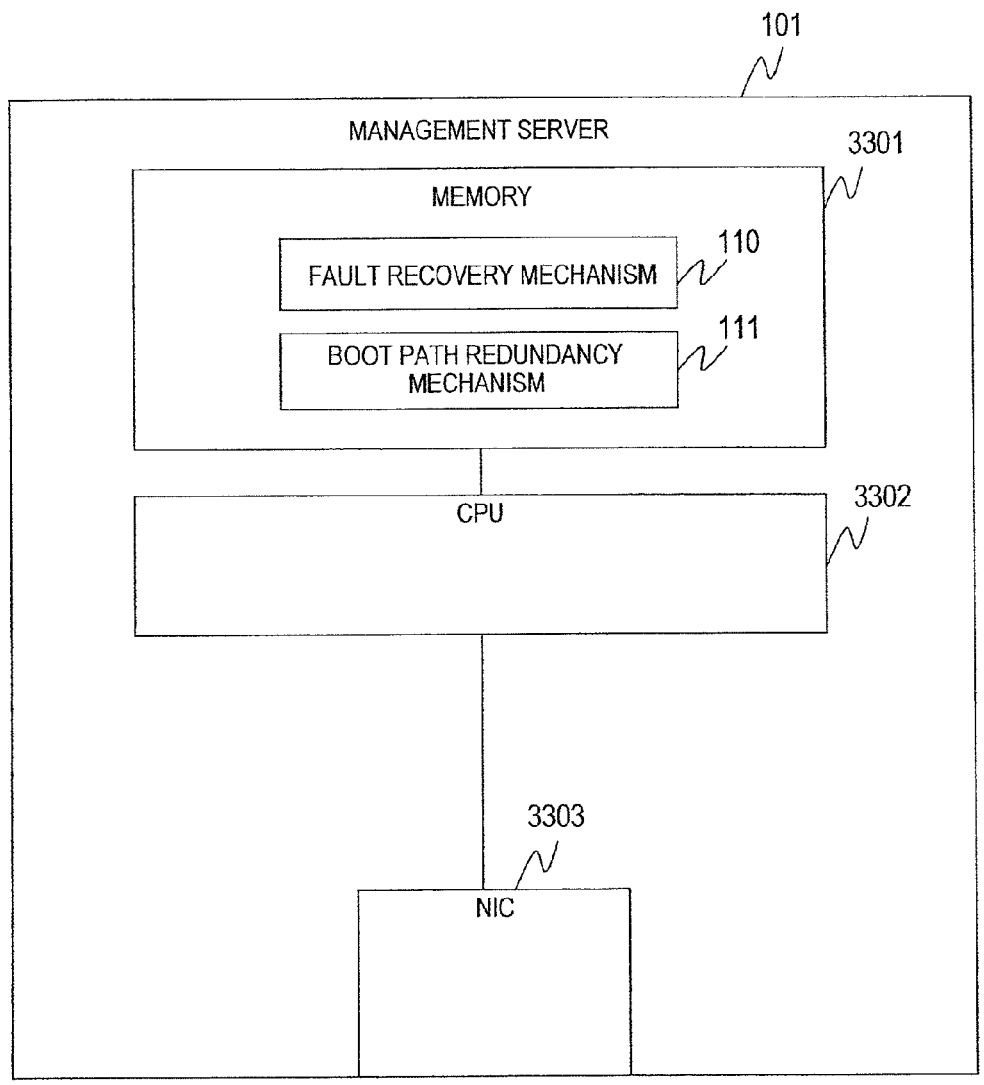
FIG. 33 is a block diagram showing a configuration of a management server in detail according to the first embodiment of this invention.

FIG. 33 is a block diagram showing a configuration of the management server 101 in detail according to the first embodiment of this invention.

The management server 101 includes a memory 3301, a CPU 3302, and a NIC 3303.

The memory 3301 is, for example, a semiconductor memory, for storing a program and data. The fault recovery program 110 and the booth path redundancy program 111 are programs stored in the memory 3301. Those programs are executed by the CPU 3302.

The CPU 3302 is a processor for executing the program stored in the memory 3301. To be specific, the CPU 3302 executes the fault recovery program 110 and the boot path redundancy program 111. Accordingly, in description to be made below, processing executed by those programs is actually executed by the CPU 3302.

The NIC 3303 is an interface connected to the management NW-SW 105.

Figure 3:
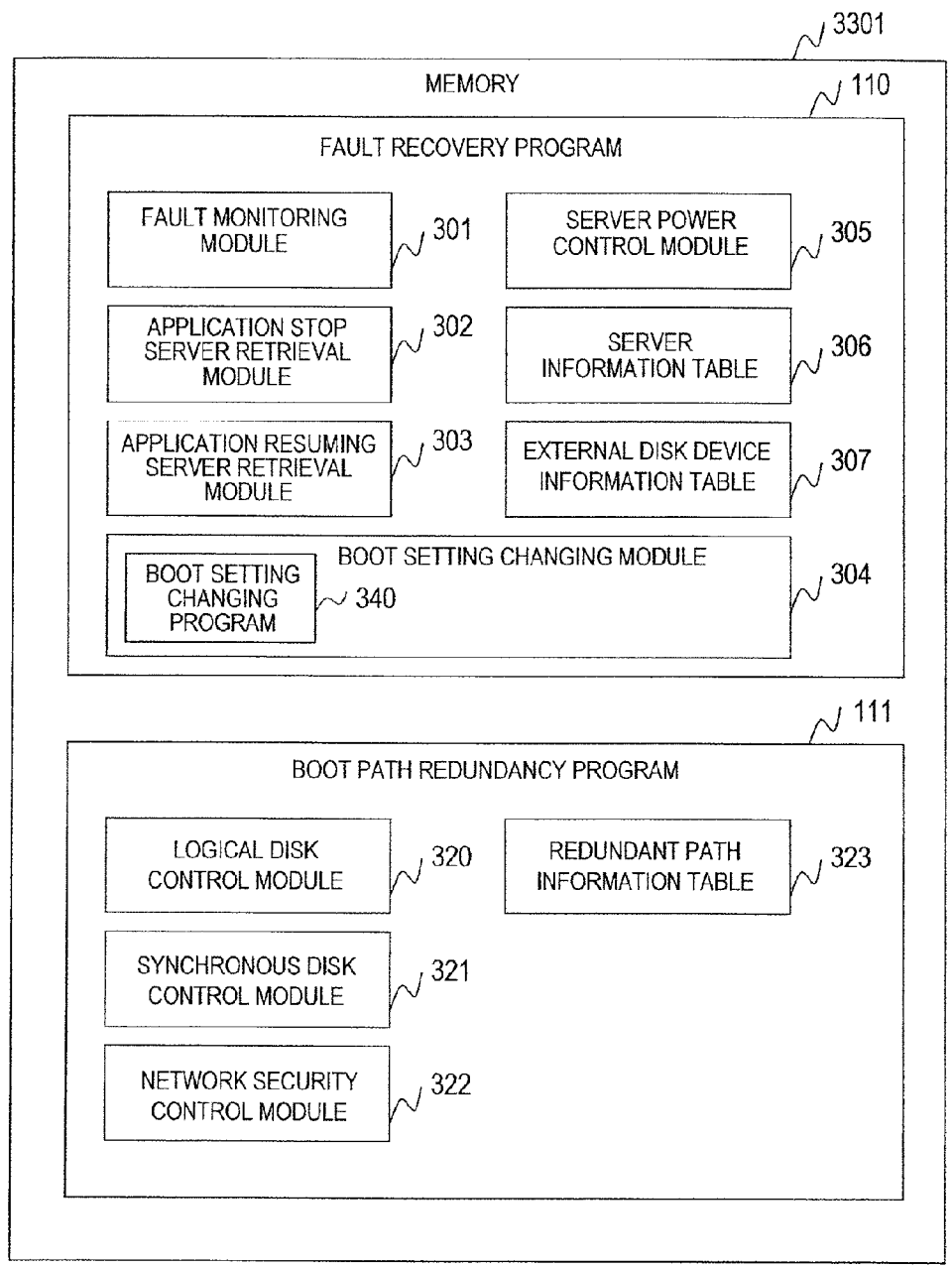
FIG. 3 is an explanatory diagram showing a fault recovery program and a boot path redundancy program in detail according to the first embodiment of this invention.

FIG. 3 is an explanatory diagram showing the fault recovery program 110 and the boot path redundancy program 111 in detail according to the first embodiment of this invention.

The fault recovery program 110 includes a fault monitoring module 301, an application stop server retrieval module 302, an application resuming server retrieval module 303, a boot setting changing module 304, a server power control module 305, a server information table 306, and an external disk device info' illation table 307.

The fault monitoring module 301 monitors a state of a device such as the server 102, the network switch 104, the external disk device 103, or the controller 130 of the computer system to detect a fault occurrence in the device.

The application stop server retrieval module 302 retrieves the server 102 disabled to operate due to the fault in the device of the computer system.

When one of the servers 102 is disabled to operate, the application resuming server retrieval module 303 retrieves another server 102 which resumes the application of the server 102 which is disabled to operate and path information of a network used by the another server 102.

The boot setting changing module 304 changes boot setting of the server 102. The boot setting changing module 304 includes, for example, a DHCP server function of booting the server 102 by using the PXE protocol, and can transmit a boot setting changing program 340 to the server 102.

The boot setting changing program 340 is executed by the server 102 which has received the boot setting changing program 340 to change setting of the boot program 210 of the server 102. To be specific, by changing information registered in the nonvolatile memory 203, the boot setting changing program 340 can change the disk 131 used by the boot program 210 for executing booting, and an access path used for accessing the disk 131. The access path passes specifically the NW-SW 104 or the controller 130 used for accessing.

The server power control module 305 executes power control for power-ON or OFF or resetting for the server 102.

The server information table 306 manages a state of the server 102, information of the external disk device 103 used by the server 102, or 5 information of a network path used by the server 102.

The external disk device information table 307 manages information such as a port ID of the external disk device 103. The port ID is an identifier (e.g., WWN) added to a port disposed in the controller 130 of the external disk device 103.

The boot path redundancy program 111 includes a logical disk control module 320, a synchronous disk control module 321, a network security control module 322, and a redundant path information table 323.

The logical disk control module 320 controls a logical disk constituted of the disk 131 in the external disk device 103. The logical disk is a virtual storage volume recognized as one information storage device by the server 102.

The synchronous disk control module 321 controls a synchronous disk. The synchronous disk is a disk 131 which records contents identical to those of a certain disk 131, and is included in the external disk device 103 different from that in which the certain disk 131 is included. Data recorded in the certain disk 131 to be used by the server 102 is also recorded in a synchronous disk of the disk 131.

The network security control module 322 controls security setting in the network.

The redundant path information table 323 manages network path which enables access to the disk 131 of the computer system.

FIG. 4 is an explanatory diagram showing the server information table 306 according to the first embodiment of this invention.

Columns 401 to 408 of the server management table 306 include a list of servers 102 in the computer system, an application state of each server 102, a disk in the network used by each server 102, and information regarding a used network path.

In the column 401, information for identifying the server 102 in the computer system is registered. For example, the column 401 may be a serial number, a UUID, a MAC address, or the like of the server 102. In an example of FIG. 2, "S1", "S2", or the like is registered in the column 401.

The column 402 indicates a state of the server 102 registered in the column 401. For example, when the server 102 is being operated, the column 402 corresponding to the server 102 is "being operated". The column 402 corresponding to the server 102 not being operated is "standing-by".

When another server 102 takes over the application of the server 102 being operated, the column 402 corresponding to the latter server 102 is "stopped". In the column 402 corresponding to the latter server 102, an identifier of the server 102 which has taken over the application is registered. For example, as shown in FIG. 4, when an application of the server "S2" is taken over by the server "S7", "change to S7" is registered in the column 402 corresponding to "S2".

On the other hand, in the column 402 of the server 102 which has 25 taken over the application, "being operated" and an identifier of the server 102 being operated is registered. In the case of the server "S7" of FIG. 2, "change from S2" is registered in the column 402.

In the column 403, an identifier of a disk image indicating contents of the disk 131 used by the server 102 registered in the column 401 is registered. The disk image identifier is unique in the computer system. For example, when a plurality of disks 131 record identical disk images, the disks 131 are indicated by identical disk image identifiers. The disk image identifier corresponds to a column 601 of the redundant path information table 323 of the booth path redundancy program 111 described below.

In the column 404, registered is information indicating which of the network paths specified by the columns 405 to 408 is used by the server 102 registered in the column 401. To be specific, "YES" is registered in the column 404 corresponding to a path used by the server 102.

When there are a plurality of network paths used by one server 102 for accessing one disk 131, a path being used is registered for each network path. In the example of FIG. 4, the server "S0" can use two network paths for accessing the disk image "D0". Accordingly, the column 404 corresponding to the server "S0" and the disk "D0" is divided into two, and "YES" and "NO" are respectively registered.

The server "S0" is a server 102 identified by the server identifier "S0".

The disk image "D0" is a disk image identified by the disk image identifier "D0". A similar notation method will be applied to portions of the computer system of this embodiment hereinafter.

The columns 405 to 408 indicate pieces of information regarding the network path used by the server 102 for accessing the disk 131.

The column 405 indicates an identifier (WWN) of the adaptor 120 disposed in the server 102 registered in the column 401.

The column 406 indicates an identifier of the NW-SW 104 connected to the adaptor 120 registered in the column 405.

The column 407 indicates an identifier of the external disk device 103 connected to the NW-SW 104 registered in the column 406.

The column 408 indicates an identifier of a controller 130 connected to the NW-SW 104 indicated by the column 406 among the controllers 130 disposed in the external disk device 103 registered in the column 407.

For example, in an example of FIG. 4, corresponding to a value "S0" of the column 401, a value "being operated" of the column 402, a value "D0" of the column 403, values "YES" and "NO" of the column 404, a value "WWN0" of the column 405, a value "SW0" of the column 406, values "ARRAY0" and "ARRAY1" of the column 407, and values "CTRL0" and "CTRL0" of the column 408 are registered. Those values indicate the following state.

That is, the server 121 whose identifier is "S0" includes an adaptor 120 whose identifier is "WM/N0". The adaptor 120 whose identifier is "WWN0" is connected to a controller 130 whose identifier is "CTRL0" of the external disk device 103 whose identifier is "ARRAY0" via the NW-SW 104 whose identifier is "SW0". The adaptor 120 whose identifier is "WWN0" is also connected to a controller 130 whose identifier is "CTRL0" of the external disk device 103 whose identifier is "ARRAY1" via the NW-SW 104 whose identifier is "SW0". The external disk devices "ARRAY0" and "ARRAY1" both include disks 131 in which disk images "D0" have been recorded.

In this example, the server "S0" is operated by accessing the disk "D0" by using a path reaching the external disk device "ARRAY0" via the adaptor "WWN0", the NW-SW "SW0" and the controller "CTRL0". Alternatively, the server "S0" can access the disk "D0" by using a path reaching the external disk device "ARRAY1" via the adaptor "WWN0", the NW-SW "SW0", and the controller "CTRL0". However, in the example of FIG. 4, this path is not used.

FIG. 5 is an explanatory diagram showing the external disk device information table 307 according to the first embodiment of this invention.

The external disk device information table 307 manages information of the external disk device 103 disposed in the computer system.

A column 501 indicates an identifier of the external disk device 103 present in the computer system. As shown in FIG. 1, the computer system of this embodiment includes two external disk devices 103. Thus, in the column 501, identifiers "ARRAY0" and "ARRAY1" of the two external devices 103 are registered. The column 501 corresponds to the column 407 shown in FIG. 4.

A column 502 is an identifier of the controller 130 disposed in the external disk device 103 indicated by the column 501. As shown in FIG. 1, the external disk device 103 of this embodiment includes two controllers 130. Accordingly, in the column 502, identifiers "CTRL0" and "CTRL1" of the two controllers 130 are registered for each external disk device 103. The column 502 corresponds to the column 408 shown in FIG. 4.

A column 503 indicates an identifier (i.e., port ID) of a port (not 25 shown) disposed in the controller 130 indicated by the column 502. For example, when the port of the controller 130 is connected to the fibre channel network, WWN or the like of the port may be registered in the column 503. When the port is connected to the network using iSCSI or TCP of Ethernet protocol such as a network file system, an IP address, a MAC address, or the like of the port may be registered in the column 503.

In the example of FIG. 5, a world wide port name (WWPN) is used as a port ID. To be specific, port ID's of ports disposed in the controllers "CTRL0" and "CTRL1" of the external disk device "ARRAY0" are respectively "WWPN0" and "WWPN1". Port ID'S of ports disposed in the controllers "CTRL0" and "CTRL1" of the controllers of the external disk device "ARRAY1" are respectively "WWPN2" and "WWPN3".

FIG. 6 is an explanatory diagram showing the redundant path information table 323 according to the first embodiment of this invention.

The redundant path information table 323 manages information of a disk image present in the computer system.

A column 601 indicates an identifier of a disk image. As there are five disk images in the computer system of this embodiment, in the column 601, identifiers "D0", "D1", "D2", "D4", and "D5" of the five disk images are registered. The column 601 corresponds to the column 403 shown in FIG. 4.

A column 602 indicates an external disk device 103 equipped with the disk 131 in which the disk image indicated by the column 601 has been recorded. In an example of FIG. 6, disk images "D0", "D1", and "D2" are recorded in the disk 131 in the external disk device "ARRAY0", and disk images "D4" and "D5" are recorded in the disk 131 in the external disk device "ARRAY1".

A column 603 indicates an identifier for uniquely identifying the disk 131 included in the external disk device 103 indicated by the column 602 to record the disk image indicated by the column 601, in the external disk device 103. In the example of FIG. 6, the disk images "D0", "D1", "D2", "D4", and "D5" are respectively recorded in disks "VOL0", "VOL1", "VOL2", "VOL4", and "VOL5".

A column 604 indicates an identifier of a controller 130 which can access the disk 131 indicated by the column 603. In other words, a device connected to a port included in the controller 130 indicated by the column 604 can access the disk 131 indicated by the column 603. The column 604 may contain information indicating permission of access to the disk 131 for each port when the controller 130 includes a plurality of ports.

In the example of FIG. 6, the device connected to the controllers "CTRL0" and "CTRL1" of the external disk device "ARRAY0" can access the disks "VOL0", "VOL1", and "VOL2". Further, the device connected to the controllers "CTRL0" and "CTRL1" of the external disk device "ARRAY1" can access the disks "VOL4" and "VOL5".

A column 605 indicates an identifier of a logical disk which the controller 130 indicated by the column 604 gives to the disk 131. The logical disk is a logical (virtual in other words) disk set by the controller 130 to enable the server 102 to access the disk 131. The server 102 recognizes the logical disk to issue an access request to the logical disk. Upon reception of the access request, the controller 130 executes access to the disk 131 corresponding to the logical disk of a request target. Management of the logical disk by the controller 130 will be described below in detail (refer to FIG. 7).

Each controller 130 can provide a unique logical disk identifier in the controller 130 to the disk 131 used by the controller 130. Accordingly, in general, the plurality of controllers 130 may provide different logical disk identifiers to the same disk 131. According to this invention, however, as shown in FIG. 6, the controllers 130 provide the same logical disk identifier to the same disk 131.

In the example of FIG. 6, corresponding to the disks "VOL0", "VOL1", "VOL2", "VOL4", and "VOL5", logical disk identifiers "LUN0", "LUN1", "LUN2", "LUN4", and "LUN5" are provided. Accordingly, those logical disk identifiers are registered in the column 605.

A column 606 indicates an identifier of the external disk device 103 which includes a synchronous disk of the disk 131 indicated by the column 603. In the example of FIG. 6, synchronous disks of the disks "VOL0", "VOL1", "VOL2", "VOL4", and "VOL5" are included in the external disk device "ARRAY1". Synchronous disks of the disks "VOL4", and "VOL5" are included in the external disk device "ARRAY0".

A column 607 indicates an identifier of the disk 131 which is included in the external disk device 103 indicated by the column 606 and which is a synchronous disk of the disk 131 indicated by the column 603. In the example of FIG. 6, the synchronous disks of the disks "VOL0", "VOL1", "VOLT, "VOL4", and "VOL5" are respectively disks "SVOL0", "SVOL1", "SVOL2", "SVOL4" and "SVOL5".

A column 608 indicates an identifier of the controller 130 which can access the disk 131 indicated by the column 607. The column 608 may contain information indicating permission of access to the disk 131 for each port when the controller 130 includes a plurality of ports.

In the example of FIG. 6, the device connected to the controllers "CTRL0" and "CTRL1" of the external disk device "ARRAY1" can access the disks "SVOL0", "SVOL1", and "SVOL2". The device connected to the controller "CTRL0" of the external disk device "ARRAY0" can access the disk "SVOL4". Further, the device connected to the controllers "CTRL0" and "CTRL1" of the external disk device "ARRAY0" can access the disk "SVOL5".

A column 609 indicates a logical disk identifier used by the controller 130 indicated by the column 608 for identifying the disk 131 indicated by the column 607. In the example of FIG. 6, corresponding to the disks "SVOL0", "SVOL1", "SVOL2", "SVOL4", and "SVOL5", logical disk identifiers "LUN10", "LUN 11", "LUN 12" "LUN 14", and "LUN 15" are provided.

Figure 7:
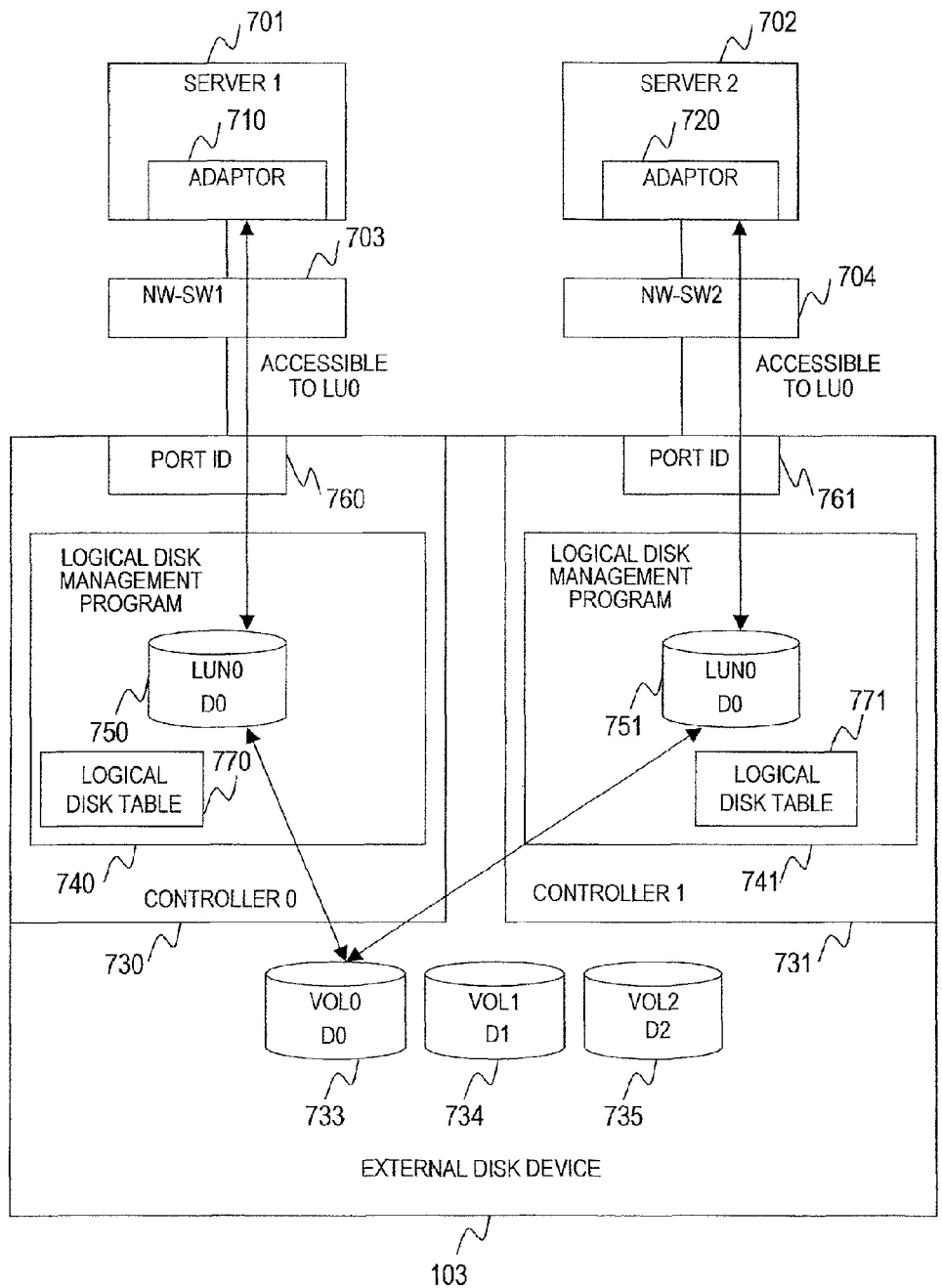
FIG. 7 is an explanatory diagram showing a logical disk management program provided in the external disk device according to the first embodiment of the this invention.

FIG. 7 is an explanatory diagram showing a logical disk management program disposed in the external disk device 130 according to the first embodiment of this invention.

For example, the external disk device 103 of FIG. 7 corresponds to the external disk device "ARRAY0" of FIG. 6.

Controllers 730 and 731 of FIG. 7 respectively correspond to the controllers 130 of FIG. 1. For example, the controllers 730 and 731 respectively correspond to the controllers "CTRL0" and "CTRL1" of FIG. 6.

Logical disk management programs 740 and 741 are respectively stored in memories (not shown) of the controllers 730 and 731, and executed by processors (not shown) of the controllers.

Servers 701 and 702 respectively correspond to the servers 102 of FIG. 1.

NW-SW's 703 and 704 respectively correspond to the NW-SW's 104 of FIG. 1.

Disks 733, 734, and 735 respectively correspond to the disks 131 of FIG. 1. For example, the disks 733, 734, and 735 respectively correspond to the disks "VOL0", "VOL1", and "VOL2" of FIG. 6.

The logical disk management programs 740 and 741 generates, for example, logical disks 750 and 751 corresponding to a single disk 733 among the disks 733, 734, and 735 present in the external disk device 103. The logical disks 750 and 751 correspond to the entire disk 733. When the external disk device 103 of FIG. 7 correspond to the external disk device "ARRAY0" of FIG. 6, the logical disks 750 and 751 both correspond to the logical disk "LUN0".

As a result, the server 701 connected to a port of the controller 731 via the NW-SW 703, and the server 702 connected to a port of the controller 732 via the NW-SW 704 can both access the disk 733.

Logical disk tables 770 and 771 are tables for storing information indicating correspondence between the disks 733, 734, and 735 and the logical disks 750 and 751 (refer to FIG. 8). The logical disk tables 770 and 771 are stored in memories (not shown) of the controllers 730 and 731.

The logical disk management program 740 and 741 can generate, delete, or change logical disks 750 and 751 under control of the management server 101 connected to management ports (not shown) of the controllers 730 and 731. When the controllers 730 and 731 do not have logical disks 740 and 741, the servers 701 and 702 can directly access the disks 733, 734, and 735.

In FIG. 7, the logical disk "LUN0" corresponding to the disk "VOL0" alone is shown. In reality, however, logical disks "LUN1" and "LUN2" corresponding to the disks "VOL1" and "VOL2" may be generated by both of the controllers 730 and 731.

When the external disk device 103 shown in FIG. 7 is the external disk device "ARRAY0" of FIG. 6, this external disk device 103 further includes disks "VOL4" and "VOL5". In this case, logical disks "LUN4" and "LUN5" corresponding to the disks "SVOL4" and "SVOL5" are generated by both of the controllers 730 and 731.

FIG. 8 is an explanatory diagram showing a logical disk table according to the first embodiment of this invention.

FIG. 8 shows a representative of the logical disk tables 770 and 771 15 of FIG. 7 in detail.

A column 801 is an identifier of a disk. For example, when identifiers of the disks 733, 734, and 735 shown in FIG. 7 are respectively "VOL0", "VOL1", and "VOL2", those identifiers are registered in the column 801. When the external disk device 103 of FIG. 7 is the external disk device "ARRAY0" of FIG. 6, in the column 801, "SVOL4" and "SVOL5" are further registered. Accordingly, the column 801 corresponds to the columns 603 and 608 of FIG. 6.

A column 802 is an identifier of a logical disk corresponding to the disk indicated by the column 801. In an example of FIG. 8, as logical disk identifiers corresponding to the disks "VOL0", "VOL1", "VOLT", "SVOL4", and "SVOL5", "LUN0", "LUN1", "LUN2", "LUN14", and "LUN15" are respectively registered. The column 802 corresponds to the columns 605 and 609 of FIG. 6.

Figure 9:
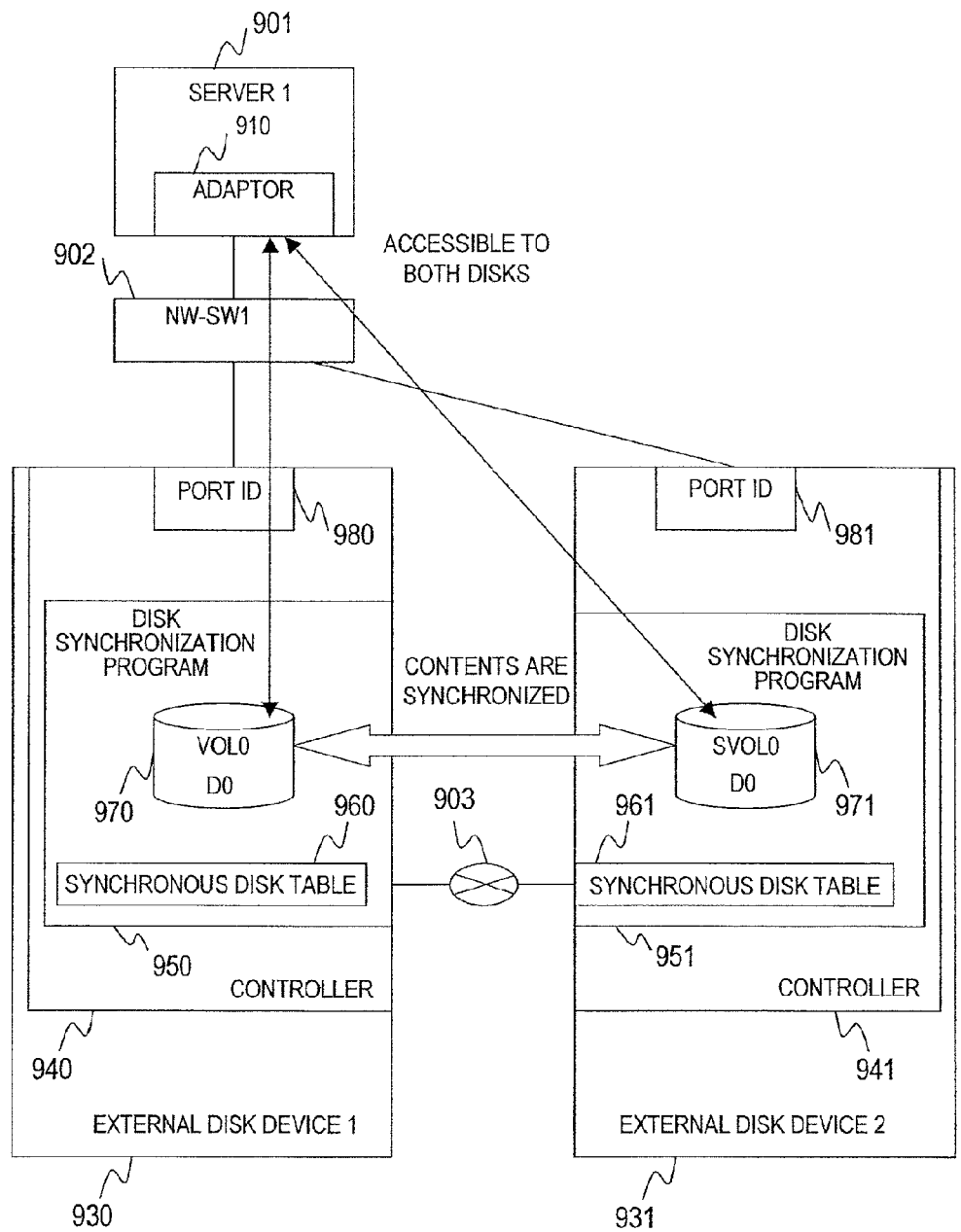
FIG. 9 is an explanatory diagram showing a disk synchronous program provided in the external disk device according to the first embodiment of this invention.

FIG. 9 is an explanatory diagram showing a disk synchronization 5 program disposed in the external disk device according to the first embodiment of this invention.

In an example of FIG. 9, external disk devices 930 and 931 correspond to the external disk devices "ARRAY0" and "ARRAY1". A controller 940 corresponds to one of the controllers "CTRL0" and "CTRL1" of the external disk device "ARRAY0". A controller 941 corresponds to one of the controllers "CTRL0" and "CTRL1" of the external disk device "ARRAY1". The controllers 940 and 941 are connected via a network 903. Disks 970 and 971 respectively correspond to the disks "VOL0" and "SVOL0".

Disk synchronization programs 950 and 951 are respectively stored in memories (not shown) of the controllers 940 and 941, and executed by processors (not shown) of the controllers.

Each of the disk synchronization programs 950 and 951 generates a synchronous disk 971 for recording contents similar to those of the disk image "D0" recorded in the disk 970 of the external disk device 930, in the external disk device 931. In the example of FIG. 9, the external disk device 930 includes a disk "VOL0". In the external disk device 931, a disk "SVOL0" which is a synchronous disk of the disk "VOL0" is generated. In the disks "VOL0" and "SVOL0", identical disk images "D0" are recorded.

For convenience of explanation, FIG. 9 shows the disks "VOL0" and "SVOL0" alone. In reality, however, each external disk device may include other disks (e.g., "VOL1", "SVOL1", and the like).

A server 901 is connected to a port 980 disposed in the controller 940 via an NW-SW 902, and to a port 981 disposed in the controller 941. In this case, the controllers 940 and 941 can both access the same disk image "D0".

Synchronous disk tables 960 and 961 are tables for storing information indicating correspondence between a disk 970 and a synchronous disk 971 (refer to FIG. 10). The synchronous disk tables 960 and 961 are stored in memories (not shown) of the controllers 940 and 941.

The disk synchronization programs 950 and 951 can generate, delete or change the synchronous disk 971 under control of the management server 101 connected to management ports (not shown) of the controllers 930 and 931.

FIG. 10 is an explanatory diagram showing a synchronous disk table according to the first embodiment of this invention.

FIG. 10 shows the synchronous disk table 960 of FIG. 9 in detail as an example.

A column 1001 indicates an identifier of a disk. The column 1001 corresponds to the column 603 of FIG. 6.

A column 1002 indicates an identifier of the external disk device 103 in which the synchronous disk of the disk 131 indicated by the column 1001 is present. The column 1002 corresponds to the column 606 of FIG. 6.

A column 1003 indicates an identifier of a synchronous disk. The column 1003 corresponds to the column 607 of FIG. 6.

For example, when the external disk device 930 of FIG. 9 corresponds 25 to the external disk device "ARRAY0" of FIG. 6, "VOL0", "VOL1", and "VOL2" are registered in the column 1001. In the column 1002, "ARRAY1" is registered corresponding to "VOL0", "VOL1", and "VOL2". In the column 1003, "SVOL0", "SVOL1", and "SVOL2" are registered corresponding to "VOL0", "VOL1", and "VOL2". This means that synchronous disks of the disks "VOL0", "VOL1", and "VOL2" of the external disk device "ARRAY0" are respectively disks "SVOL0", "SVOL1", and "SVOL2" in the external disk device "ARRAY 1".

Figure 11:
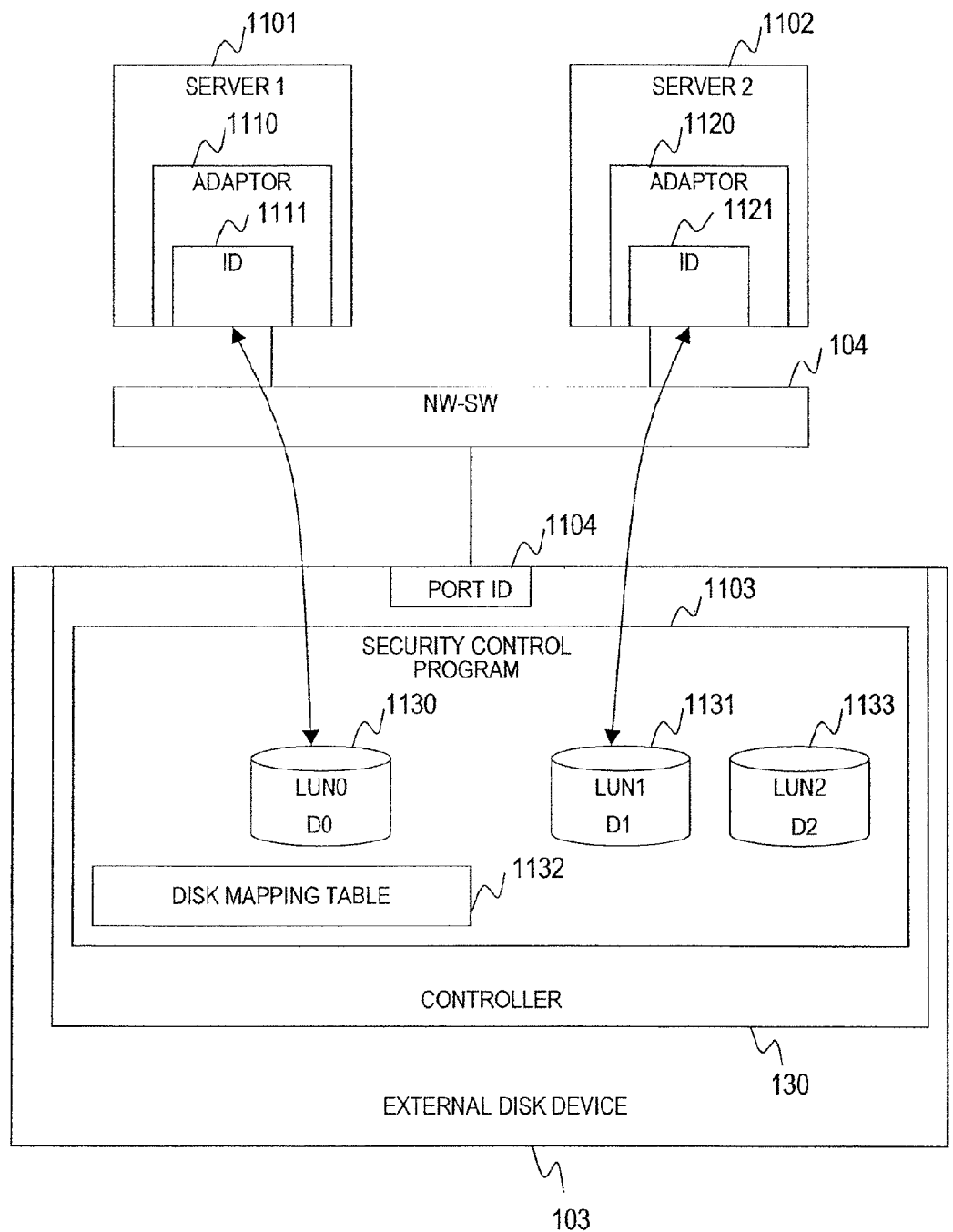
FIG. 11 is an explanatory diagram showing a security control program provided in the external disk device according to the first embodiment of the this invention.

FIG. 11 is an explanatory diagram of a security control program provided in the external disk device 103 according to the first embodiment of 10 this invention.

The security control program 1103 is stored in a memory (not shown) of the controller 130 to be executed by a processor (not shown) of the controller 130.

The security control program 1103 permits or inhibits access to a logical disk from the server 102. As an example, as shown in FIG. 11, a case where a port disposed in the controller 130, an adaptor 1110 disposed in a server 1101 and an adaptor 1120 disposed in a server 1102 are interconnected via the NW-SW 104 will be described. The adaptors 1110 and 1120 are respectively identified by ID 1111 and ID 1121.

In this case, the security control program 1103 permits access to a logical disk 1130 from the server 1101 and access to a logical disk 1131 from the server 1102, while the security control program 1103 inhibits access to the logical disk 1131 from the server 1101 and access to the logical disk 1130 from the server 1102.

As a result, the server 1101 can access the logical disk 1130 but not the logical disk 1131. The server 1102 can access the logical disk 1131 but not the logical disk 1130. Control of the access permission or inhibition is executed by setting access permission mapping between the ID 1111 and the ID 1121 and the logical disks 1130 and 1131 by the security control program 1103.

The description has been made by way of example in which the disks 1130 and 1131 are logical disks. However, the disks 1130 and 1131 may be disks 131 of FIG. 1, logical disks, or synchronous disks.

A disk mapping table 1132 of FIG. 11 is a table for storing information indicating a mapping relation between the logical disks 1130 and 1131 and the ID 1111 and the ID 1121_The security control program 1103 can set or release mapping between the logical disks 11130 and 1131 and the ID 1111 and the ID 1121 under control of the management server 101 connected to the management port (not shown) of the controller 130.

Figure 12:
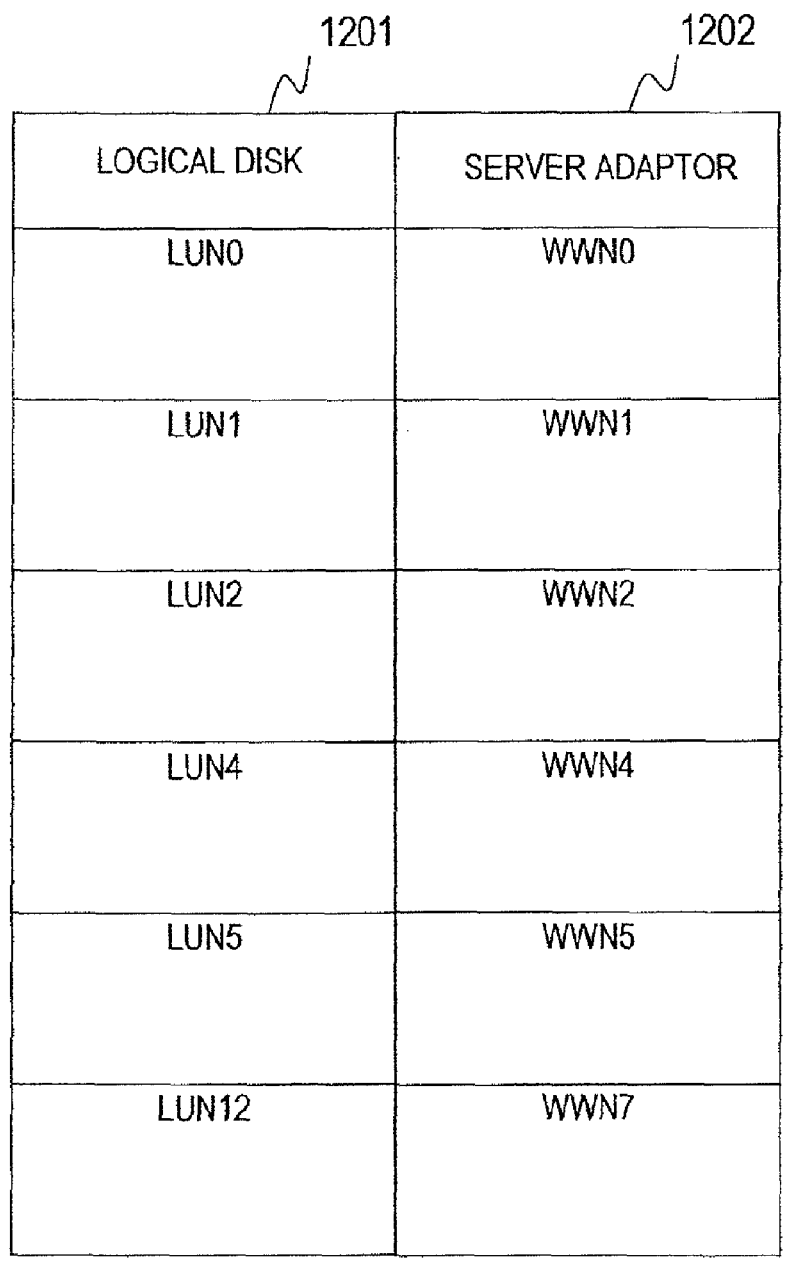
FIG. 12 is an explanatory diagram showing a disk mapping table 10 according to the first embodiment of this invention.

FIG. 12 is an explanatory diagram showing the disk mapping table 1132 according to the first embodiment of this invention.

FIG. 12 shows the disk mapping table 1132 of FIG. 11 in detail as an example.

A column 1201 indicates an identifier of a logical disk. The column 1201 corresponds to the columns 605 and 609 of FIG. 6_When the controller 130 of the external disk device 103 is not equipped with the logical disk management programs 740 and 741 shown in FIG. 7, in the column 1201, an identifier of the disk 131 of FIG. 1 or an identifier of the synchronous disk 971 of FIG. 9 may be registered.

A column 1202 indicates an ID of an adaptor permitted to access the logical disk indicated by the column 1201. For example, in the column 1202, the ID 1111 of the adaptor 1110 and the ID 1121 of the adaptor 1120 of FIG. 11 are registered.

In the example of FIG. 12, in the column 1201, logical disks "LUN0", "LUN1", "LUN2", "LUN4", "LUN5", and "LUN12" are registered. Then, corresponding to these logical disks, "WV/N0", "WWN1", "WWN2", "WWN4", "WWN5", and "WWN7" are registered in the column 1202.

This indicates that the adaptors "WWN0", "WWN1", "WWN2", "WWN4", "WWN5", and "WWN7" of the server 102 can access the logical disks "LUN0", "LUN1", "LUN2", "LUN4", "LUN5", and "LUN12", respectively. On the other hand, for example, the adaptor "WWN0" cannot access the logical disk "LUN1".

Figure 13:
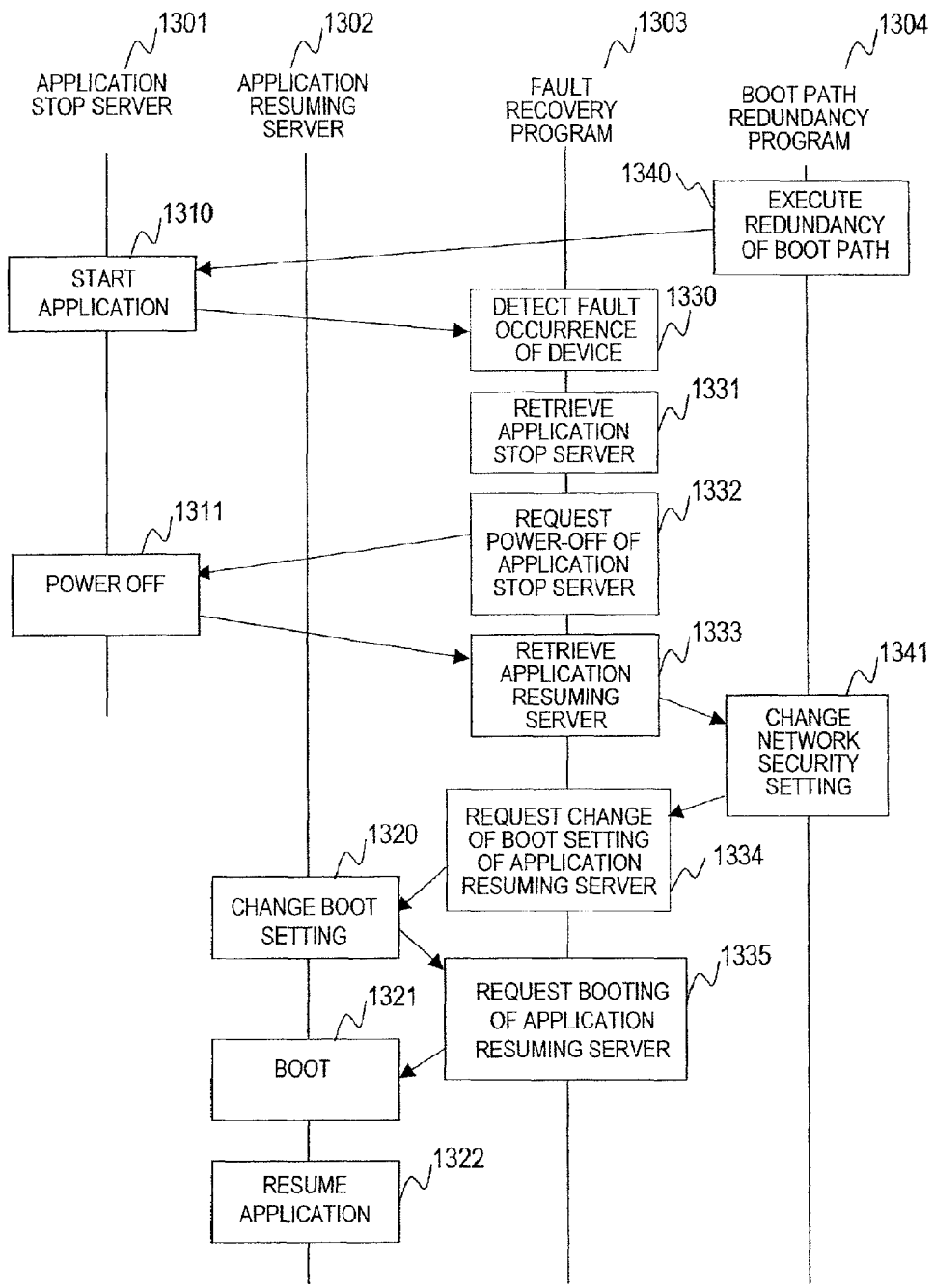
FIG. 13 is an explanatory diagram showing an application sequence executed by each device according to the first embodiment of this invention.

FIG. 13 is an explanatory diagram showing an application sequence executed by each device according to the first embodiment of this invention.

The shown sequence is an application sequence of an application stop server 1301, an application resuming server 1302, a fault recovery program 1303, and a boot path redundancy program 1304. The application stop server 1301 is a server 102 inaccessible to the disk 131 used for pursuing an application due to a fault of the computer system among the servers 102 shown in FIG. 1. As the application stop server 1301 is inhibited to access the disk 131, the application stop server 1301 cannot continue the application thereof. The application resuming server 1302 is a server 102 which takes over the application from the application stop server 1301 among the servers 102 shown in FIG. 1. The fault recovery program 1303 and the boot path redundancy program 1304 are respectively the fault recovery program 110 and the boot path redundancy program 111 shown in FIG. 3.

First, the boot path redundancy program 1304 executes redundancy of a boot path (step 1340). As a result of executing the step 1340, a disk image used by the application stop server 1301 is set in a state to be accessed by a certain server 102 via the ports of one or more controllers 130 of one or more external disk devices 103. The disk image used by the application stop server 1301 is a disk image used by the application stop server 1301 for booting, recording or referring to data. At the point of this time, however, due to security setting of the network, the application stop server 1301 alone is in a state of being permitted to access the disk image used by the application stop server 1301. Processing of the step 1340 will be described below in detail (refer to FIG. 14).

Next, the application stop server 1301 starts the application thereof (step 1310).

A fault occurs in a certain device of the computer system. At this time, the fault recovery program 1303 detects the occurrence of the fault in the device (step 1330).

Then, the fault recovery program 1303 retrieves the server 102 whose application is stopped due to the fault of the device (step 1331). In the example of FIG. 13, the server 102 discovered as a result of this retrieval is the application stop server 1301. In the step 1331, the plurality of application stop servers 1301 may be discovered.

The fault recovery program 1303 requests power-OFF for the application stop server 1301 (step 1332). The application stop server 1301 that has received the request turns power OFF (step 1311). The application stop server 1301 may execute shutting-down of the OS, a stopping procedure of an application, or work for fault analysis such as memory dump acquisition or log acquisition before the power-OFF. After the fault recovery program 1303 confirms the stop of the application stop server 1301, the process proceeds to a step 1333.

In the step 1333, the fault recovery program 1303 retrieves the application resuming server 1302. To be specific, the server 102 accessible to the disk image which was used by the application stop server 1301 and connected to the port of the fault-free controller 130 without interpolation of the faulted device is retrieved as the application resuming server 1302. When a plurality of application stop servers 1301 are present, the fault recovery program 1303 retrieves the same number of application resuming servers 1302.

Upon completion of the retrieval of the application resuming server 1302, the boot path redundancy program 1304 changes network security setting (step 1341). To be specific, the boot path redundancy program 1304 changes security setting of the network so that the application resuming server 1302 can access the disk image used by the application stop server 1301.

Upon completion of security setting change of the network, the fault recovery program 1303 boots the application resuming server 1302 through the network to change boot setting of the application resuming server 1302 (step 1334). At this time, the fault recovery program 1303 transmits the boot setting changing program 340 to the application resuming server 1302. As a result, the application resuming server 1302 is booted through the network (step 1320). Then, the application resuming server 1302 updates a parameter necessary for booting stored in the application resuming server 1302 by executing the boot setting changing program 340 transmitted from the fault recovery program 1303.

Upon completion of boot setting change, the fault recovery program 1303 instructs the application resuming server 1302 to use the disk image used by the application stop server 1301 to boot (step 1335).

The application resuming server 1302 that has received the instruction of the step 1335 boots by using the disk image used by the application stop server 1301 (step 1321). To be specific, the application resuming server 1302 boots by reading the OS or the like from the disk image used by the application stop server 1301.

Then, the application resuming server 1302 resumes the application executed by the application stop server 1301 (step 1332).

Figure 14:
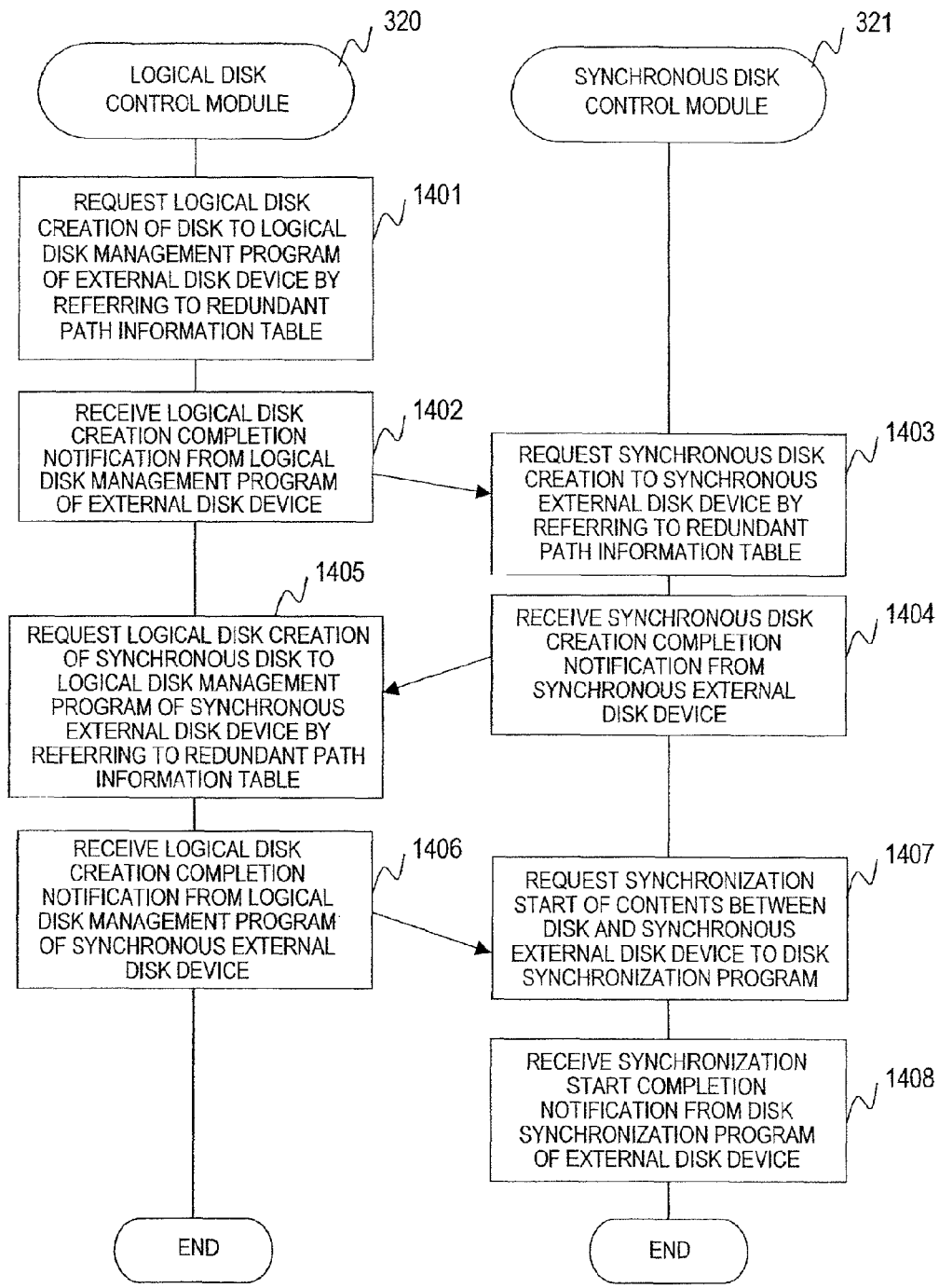
FIG. 14 is a flowchart showing redundancy of a boot path executed by the boot path redundancy program according to the first embodiment of this invention.

The sequence shown in FIG. 13 will be described below in detail FIG. 14 is a flowchart showing redundancy of the boot path executed by the boot path redundancy program 111 according to the first embodiment of this invention.

FIG. 14 shows the step 1340 of FIG. 13 in detail. The sequence of 20 FIG. 14 is executed by the logical disk control module 320 and the synchronous disk control module 321.

Processing of FIG. 14 is executed by targeting the disk 131 when there is a disk image recorded in only one disk 131 in the computer system. For example, when the disk image "DO" is recorded in the disk "VOL0" alone, the processing of FIG. 14 is executed by targeting the disk "VOL0". As a result, a disk "SVOL0" is created.

First, the logical disk control module 320 requests creation of a logical disk corresponding to the disk 131 to be processed to the logical disk management program of the external disk device by referring to the redundant path information table 323 (step 1401). For example, the logical disk control module 320 refers to the redundant path information table 323 of FIG. 6 to request creation of the logical disk indicated by the column 605 in the controller indicated by the column 604 as a logical disk corresponding to the disk 131 indicated by the column 603 to the external disk device 103 indicated by the column 602.

The external disk device 103 that has received the request creates a logical disk in response to the request. Upon completion of logical disk creation, the external disk device 103 transmits a completion notification to the logical disk control module 320.

The logical disk control module 320 receives the logical disk creation completion notification from the logical disk management program of the external disk device 103 (step 1402).

Subsequently, the synchronous disk control module 321 refers to the redundant path information table 323 to request creation of a synchronous disk to the synchronous external disk device (step 1403). For example, the synchronous disk control module 321 refers to the redundant path information table 323 of FIG. 6 to request creation of the synchronous disk indicated by the column 607 to the synchronous external disk device indicated by the column 606.

The external disk device 103 that has received the request creates a synchronous disk in response to the request. Then, the external disk device 103 transmits a completion notification to the synchronous disk control module 321.

The synchronous disk control module 321 receives a completion 5 notification of synchronous disk creation and synchronization start from the synchronous external device (step 1404).

Then, the logical disk control module 320 refers to the redundant path information table 323 to request creation of a logical disk corresponding to the synchronous disk to the logical disk management program of the synchronous external disk device (step 1405). For example, the logical disk control module 320 requests the external disk device 103 indicated by the column 606 of FIG. 6 to create the logical disk indicated by the column 609 in the controller indicated by the column 608 as a logical disk corresponding to the disk 131 indicated by the column 607.

The external disk device 103 that has received the request creates a logical disk in response to the request. Upon completion of the logical disk creation, the external disk device 103 transmits a completion notification to the logical disk control module 320.

The logical disk control module 320 receives the logical disk creation completion notification from the logical disk management program of the synchronous external disk device (1406).

Subsequently, the synchronous disk control module 321 requests the disk synchronization program to start processing of synchronizing contents between the disk 131 to be processed and the synchronous disk in the synchronous external disk device (step 1407). The processing of synchronizing the contents of the disks 131 means processing of copying contents recorded in one disk 131 to another disk 131. For example, the synchronous disk control module 321 refers to the redundant path information table 323 of FIG. 6 to request the external disk device 103 indicated by the column 602 and the external disk device 103 indicated by the column 606 to start processing of copying contents recorded in the disk 131 indicated by the column 603 to the disk 131 indicated by the column 607. The external disk device 103 that has received the request starts synchronization of the disks in response to the request. Then, the external disk device 103 transmits a synchronization start completion notification to the synchronous disk control module 321.

The synchronous disk control module 321 receives the synchronization start completion notification from the disk synchronization program of the external disk device 103 (step 1408).

Figure 15:
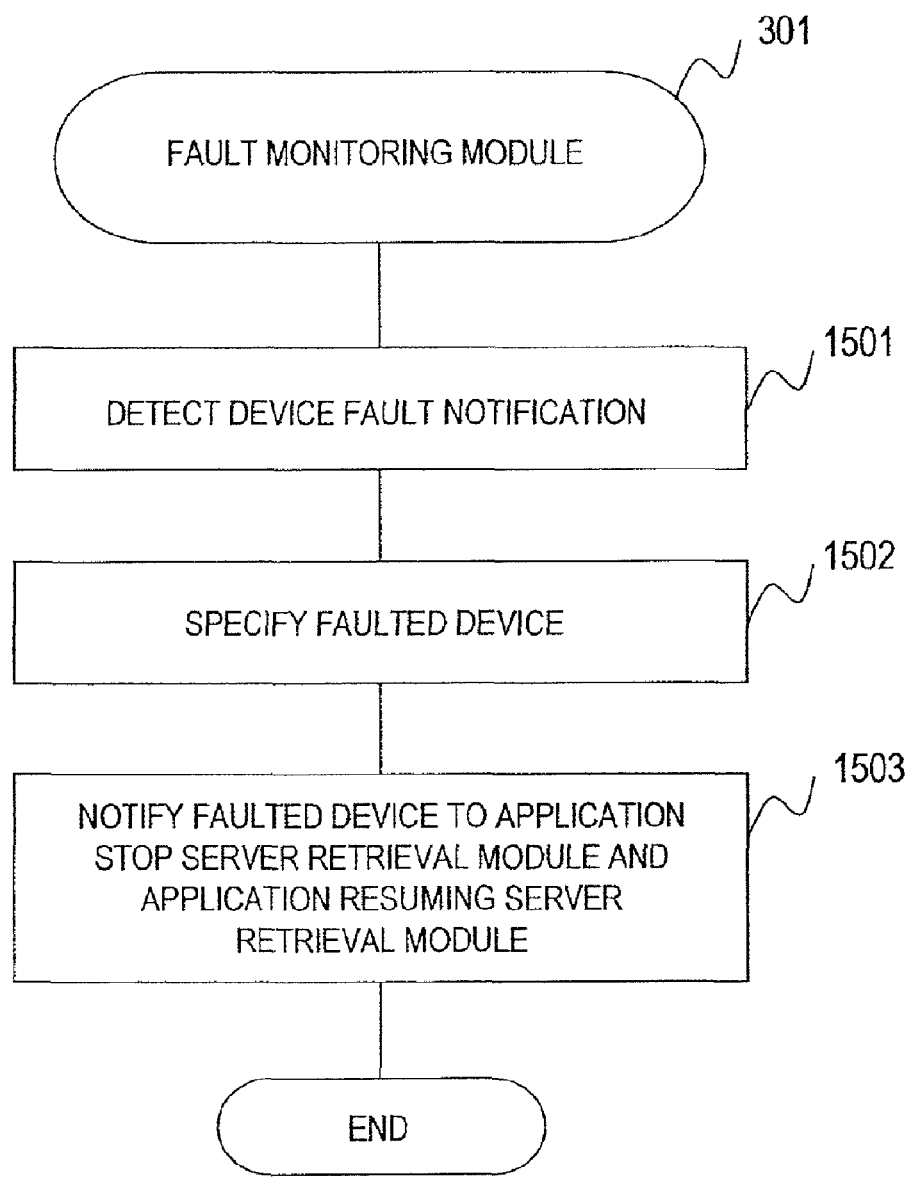
FIG. 15 is a flowchart showing fault monitoring executed by the fault recovery program according to the first embodiment of this invention.

FIG. 15 is a flowchart showing fault monitoring processing executed by the fault recovery program 110 according to the first embodiment of this invention.

The processing shown in FIG. 15 is executed by the fault monitoring module 301 in the step 1330 of FIG. 13.

When a fault occurs in a device constituting the computer system, the fault monitoring module 301 detects a fault occurrence notification of the device (step 1501). For example, the device constituting the computer system is the server 102, the adaptor 120, the NW-SW 104, the external disk device 103, or the controller 130.

The fault monitoring module 301 can communicate with the device constituting the computer system via the network. Each device can notify the fault of the device to the fault monitoring module 301 by a protocol such as simple network management protocol (SNMP) or proprietary communication means. The fault monitoring module 301 can detect the occurrence of the fault by receiving the fault occurrence notification from the device. Alternatively, the fault monitoring module 301 can detect the fault occurrence of the device by periodically making an inquiry about a device state to the device to monitor a state change.

Then, the fault monitoring module 301 specifies the device where the fault has occurred (step 1502). When the degree of the device fault is low, and the fault has no influence on an application of the computer system, the fault occurrence can be ignored.

The fault monitoring module 301 notifies an identifier of the device where the fault has occurred (hereinafter referred to as "faulted device") to the application stop server retrieval module 302 and the application resuming server retrieval module 303 (step 1503).

Figure 16:
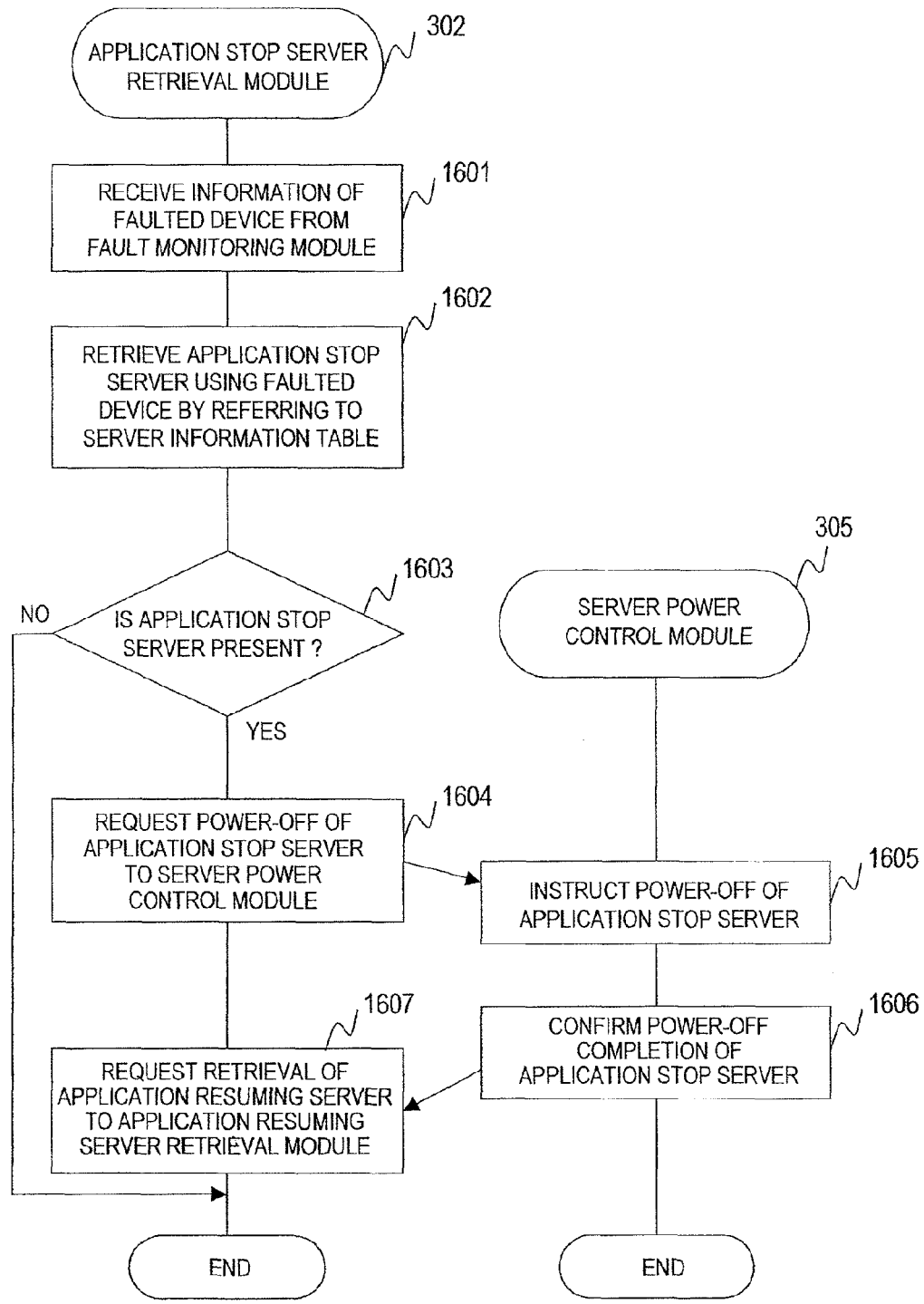
FIG. 16 is a flowchart showing application stop server retrieval and server power control executed by the fault recovery program according to the first embodiment of this invention.

FIG. 16 is a flowchart showing application stop server retrieval and server power control executed by the fault recovery program 110 according to the first embodiment of this invention.

Processing shown in FIG. 16 is executed by the application stop server retrieval module 302 and the server power control module 305 in the steps 1331 and 1332 of FIG. 13.

First, the application stop server retrieval module 302 receives the identifier of the faulted device from the fault monitoring module 301 (step 25 1601). This information has been transmitted in the step 1503 of FIG. 15.

Then, the application stop server retrieval module 302 refers to the server information table 306 to retrieve an application stop server 1301 (step 1602). The application stop server 1301 is a server 102 which uses the faulted device.

As an example, a case where a fault occurs in the controller "CTRL1" of the external disk device "ARRAY 1" will be described. In this case, in FIG. 4, a server "S4" is connected to the controller "CTRL1" of the external disk device "ARRAY1" as indicated by columns 407 and 408. As indicated by a column 404, a path from the server "S4" to the controller "CTRL1" of the external disk device "ARRAY1" is "being used". Accordingly, when a fault occurs in the controller "CTRL1" of the external disk device "ARRAY1", the server "S4" cannot continue its application. Thus, the sever "S4" becomes an application stop server 1301.

When no server 102 uses the faulted device, the application stop 15 server 1301 is not present.

Subsequently, the application stop server retrieval module 302 judges whether an application stop server 1301 is present (step 1603).

If it is judged in the step 1603 that the application stop server 1301 is not present, no server 102 needs to take over the application. In this 20 case, the processing is finished.

On the other hand, if it is judged in the step 1603 that the application stop server 1301 is present, the application stop server retrieval module 302 requests power-OFF of the application stop server 1301 to the server power control module 305 (step 1604).

Upon reception of the request, the server power control module 305 executes power-OFF of the application stop server 1301 (step 1605). For example, the server power control module 305 may request the BMC 205 shown in FIG. 2 to execute power-OFF via the network. The BMC 205 that has received the request turns power OFF for the server. Additionally, the server power control module 305 can request stopping or shutting-down of software operated in the server 102 before executing of the power-OFF.

The server power control module 305 confirms the power-OFF of the application stop server 1301 (step 1606). The server power control module 305 notifies power-OFF completion to the application stop server retrieval module 302.

Then, the processing of the server power control module 305 is finished.

Upon reception of a power-OFF completion notification, the application stop server retrieval module 302 requests the application resuming server retrieval module 303 to retrieve an application resuming server 1302 (step 1607).

Thus, the processing of the application stop server retrieval module 302 is finished.

Figure 17:
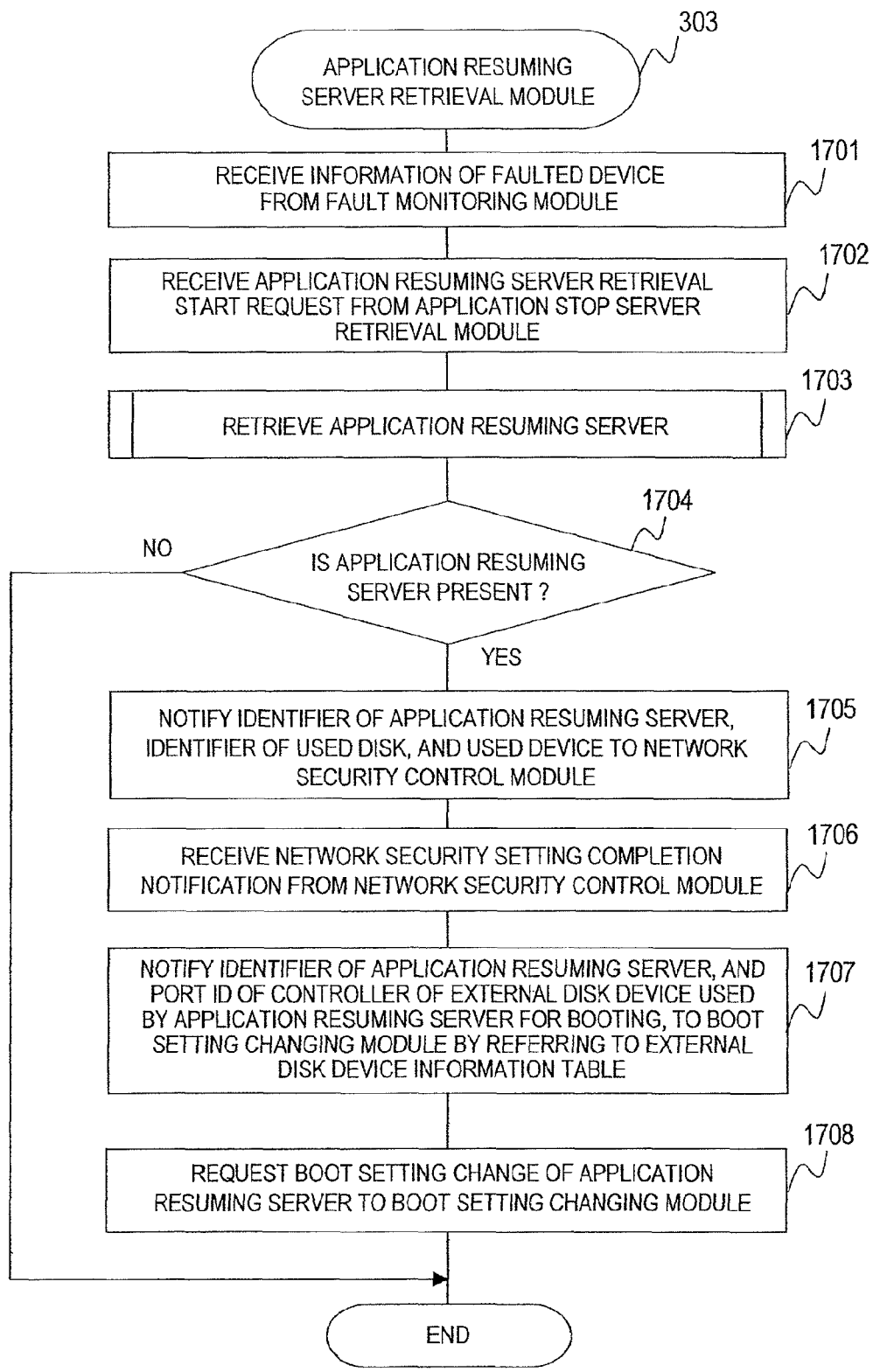
FIG. 17 is a flowchart showing application resuming server retrieval executed by the fault recovery program according to the first embodiment of this invention.

FIG. 17 is a flowchart showing application resuming server retrieval 20 executed by the fault recovery program 110 according to the first embodiment of this invention.

Processing shown in FIG. 17 is executed by the application resuming server retrieval module 303 in the steps 1333 and 1334 of FIG. 13.

First, the application resuming server retrieval module 303 receives the identifier of the faulted device from the fault monitoring module 301 (step 1701). This information has been transmitted in the step 1503 of FIG. 15.

Then, the application resuming server retrieval module 303 receives a retrieval request of an application resuming server 1302 from the application stop server retrieval module 302 (step 1702). This request has been transmitted in the step 1607 of FIG. 16.

The application resuming server retrieval module 303 retrieves the application resuming server 13402 (step 1703). This processing will be described below in detail (refer to FIG. 18).

The application resuming server retrieval module 303 refers to a result of the step 1703 to judge whether an application resuming server 1302 is present (step 1704).

If it is judged in the step 1704 that the application resuming server 1302 is not present, no server 102 can take over the application from the application stop server 1301. Accordingly, the processing is finished.

On the other hand, if it is judged in the step 1704 that the application resuming server 1302 is present, the application resuming server retrieval module 303 notifies an identifier of the application resuming server 1302, a used disk identifier, and a used device to the network security control module 322 (step 1705). The used device is a list of devices of the computer system used by the application resuming server 1302 to resume the application. For example, the used device is a combination of the devices indicated by the columns 405, 406, 407, and 408 of the server information table 306 shown in FIG. 4.

Network security setting executed by the network security control module 322 that has received the notification of the step 1705 will be described below (refer to FIG. 19).

Next, the application resuming server retrieval module 303 receives a network security setting completion notification from the network security control module 322 (step 1706). This notification has been transmitted in step 1905 of FIG. 19 described below.

Then, the application resuming server retrieval module 303 refers to the external disk device information table 307 to notify an identifier of the application resuming server 1302 and a port ID of the controller 130 of the external disk device 103 used by the application resuming server 1302 for booting, to the boot setting changing module 304 (step 1707). For example, when a controller indicted by a column 502 and disposed in the external disk device 103 indicated by a column 501 of the external disk device information table 307 is used for booting, a port ID indicated by a column 503 is notified.

The application resuming server retrieval module 303 requests the boot setting changing module 304 to change boot setting of the application resuming server 1302 (step 1708).

Thus, the processing of the application resuming server retrieval module 303 is finished.

Figure 18:
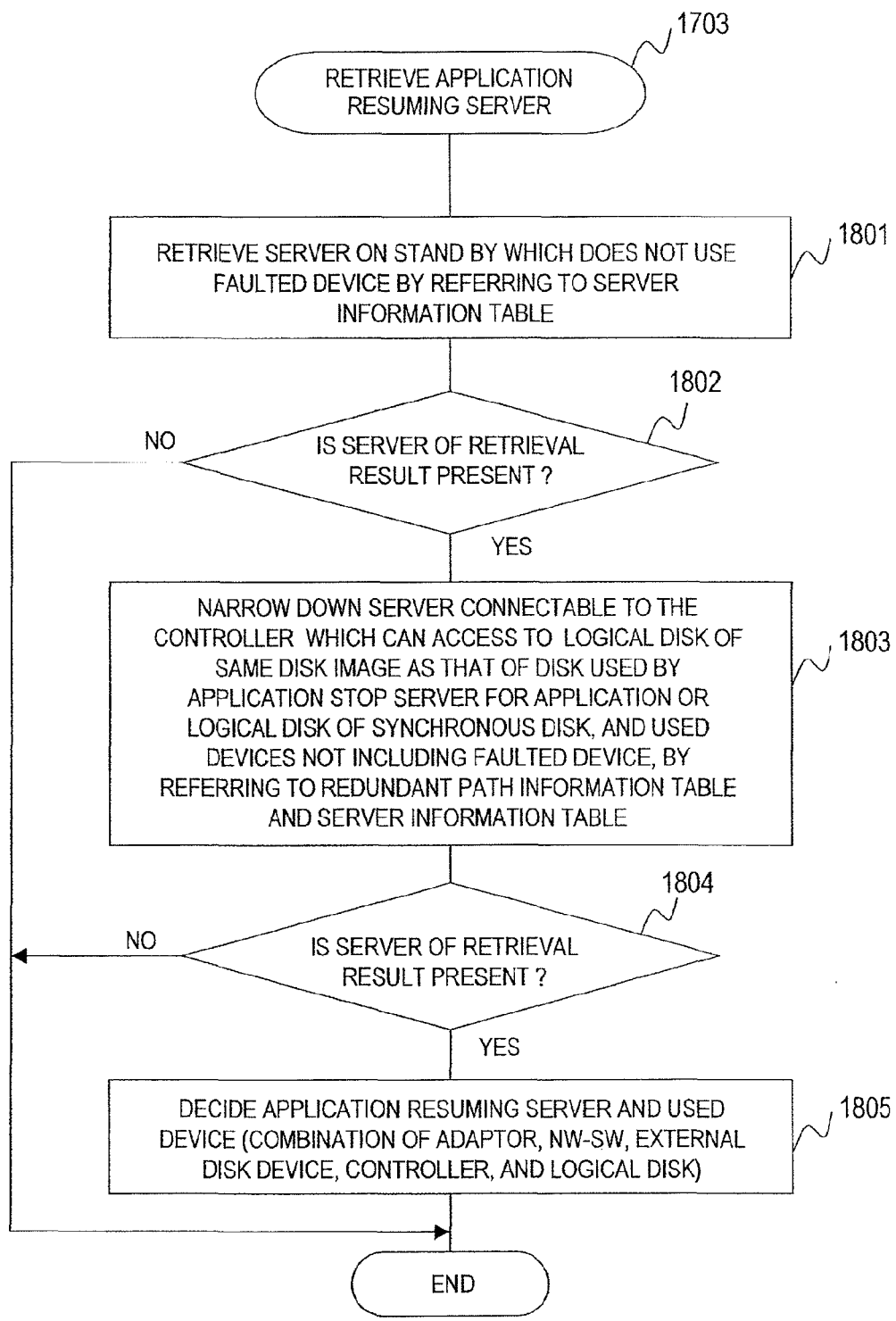
FIG. 18 is a flowchart showing the application resuming server retrieval executed by the fault recovery program in detail according to the first embodiment of this invention.

FIG. 18 is a flowchart showing application resuming server retrieval executed by the fault recovery program 110 in detail according to the first embodiment of this invention.

To be specific, FIG. 18 shows processing executed by the application resuming server retrieval module 303 in the step 1703 of FIG. 17 in detail.

First, the application resuming server retrieval module 303 refers to the server information table 306 to retrieve a standing-by server 102 which does not use the faulted device (step 1801). For example, referring to the server information table 306 of FIG. 4, a case where a fault occurs in the controller "CTRL1" of the external disk device "ARRAY1" will be described. In this case, standing-by servers "S3" and "S6" can both use the controller "CTRL1" of the external disk device "ARRAY0". In other words, these servers do not need to use the controller "CTRL1" of the external disk device "ARRAY1". Accordingly, the servers "S3" and "S6" correspond to the standing-by servers 102 which do not use the faulted device.

Next, the application resuming server retrieval module 303 refers to a retrieval result of the step 1801 to judge whether a standing-by server 102 not using the faulted device is present (step 1802).

If it is judged in the step 1802 that no server satisfying the conditions of the step 1801 is present (i.e., "NO"), no server 102 that can take over the application from the application stop server 1301 is present. In this case, the processing of FIG. 18 is finished.

If it is judged in the step 1802 that a server satisfying the conditions of the step 1801 is present, the application resuming server retrieval module 303 refers to the redundant path information table 323 and the server information table 306 to retrieve one or more servers 102 to be used as application resuming servers, and a device used by the server 102 (step 1803).

The server 102 to be used as the application resuming server is 25 specifically a server 102 connectable to the controller 130 which can access to a logical disk or a logical disk of its synchronous disk for recording the same disk image used by the application stop server 1301 for the application, among the servers 102 retrieved in the step 1801.

The device used by the server 102 is a combination of the adaptor 120, the NW-SW 104, the external disk device 103, the controller 130, and the logical disk used by the server 102 for accessing the disk image where no fault occurs.

As an example, referring to the redundant path information table 323 (FIG. 6) and the server information table 306 (FIG. 4), a case where a fault occurs in the controller "CTRL1" of the external disk device "ARRAY1", and the application stop server 1301 uses the disk image "D4" will be described.

First, the redundant path information table 323 (FIG. 6) will be referred to. The disk image "D4" is recorded in the disk "VOL4" of the external disk device "ARRAY1" and the disk "SVOL4" of the external disk device "ARRAY0". The controller "CTRL0" of the external disk device "ARRAY 1" provides the disk "VOL4" as a logical disk "LUN4" to the server 102. The controller "CTRL0" of the external disk device "ARRAY0" provides the disk "SVOL4" as a logical disk "LUN14" to the server 102.

Then, to retrieve the server 102 permitted to use the logical disk "LUN4" or "LUN14, the server information table 306 (FIG. 4) is referred to. Here, a case where the servers "S3" and "S6" are retrieved in the step 1801 will be described.

As shown in the server information table 306, the server "S3" can be connected to the controller "CTRL0" of the external disk device "ARRAY0". In other words, the server "S3" can use the logical disk "LUN 14" provided by the controller "CTRL0" of the external disk device "ARRAY0". On the other hand, the server "S6" can be connected to neither of the controller "CTRL0" of the external disk device "ARRAY1" and the controller "CTRL0" of the external disk device "ARRAY0". In other words, the server "S6" can use neither of the logical disks "LUN4" and "LUN14".

In this case, as a retrieval result of the step 1803, the server "S3" is obtained. In this case, used devices are the adaptor "WWN3" (refer to column 405), the NW-SW "SW0" (refer to column 406), the external disk device "ARRAY0", and the controller "CTRL0".

Then, the step 1803 is finished.

Next, the application resuming server retrieval module 303 judges which of the serves 102 has been discovered as a retrieval result of the step 1803 (step 1804).

If it is judged in the step 1804 that no server 102 has been discovered as the retrieval result of the step 1803 (i.e., "NO"), no server 102 is present to take over the application from the application stop server 1301. In this case, the processing of FIG. 18 is finished.

On the other hand, if it is judged in the step 1804 that a certain server 102 has been discovered as the retrieval result of the step 1803, the discovered server 102 can take over the application from the application stop server 1301. In this case, the application resuming server retrieval module 303 decides an application resuming server 1301 and a device used by the resuming server 1301 from the resultant server 102 and used device of the step 1803 (step 1805).

For example, when a plurality of servers 102 and when a plurality of devices used by servers 102 are discovered as a result of the step 1803, an application resuming server 1301 and a device used by the resuming server 1301 may be decided based on specifications of the servers 102 and the used devices, position or physical conditions thereof, or priority.

Alternatively, an application resuming server 1301 and a device used by the resuming server 1301 may be decided based on a policy described by a user.

After an end of the step 1805, the processing of FIG. 18 is finished.

Upon the end of the processing shown in FIG. 18, the processing of the application resuming server retrieval module 303 returns to the step 1704 of FIG. 17.

If the processing of FIG. 18 is finished as a result of execution of the step 1805, the application resuming server retrieval module 303 judges that the application resuming server is "present" in the step 1704.

On the other hand, if the processing of FIG. 18 is finished as a result of "NO" judgment in the step 1802 or 1804, the application resuming server retrieval module 303 judges that the application resuming server is "not present" in the step 1704.

Figure 19:
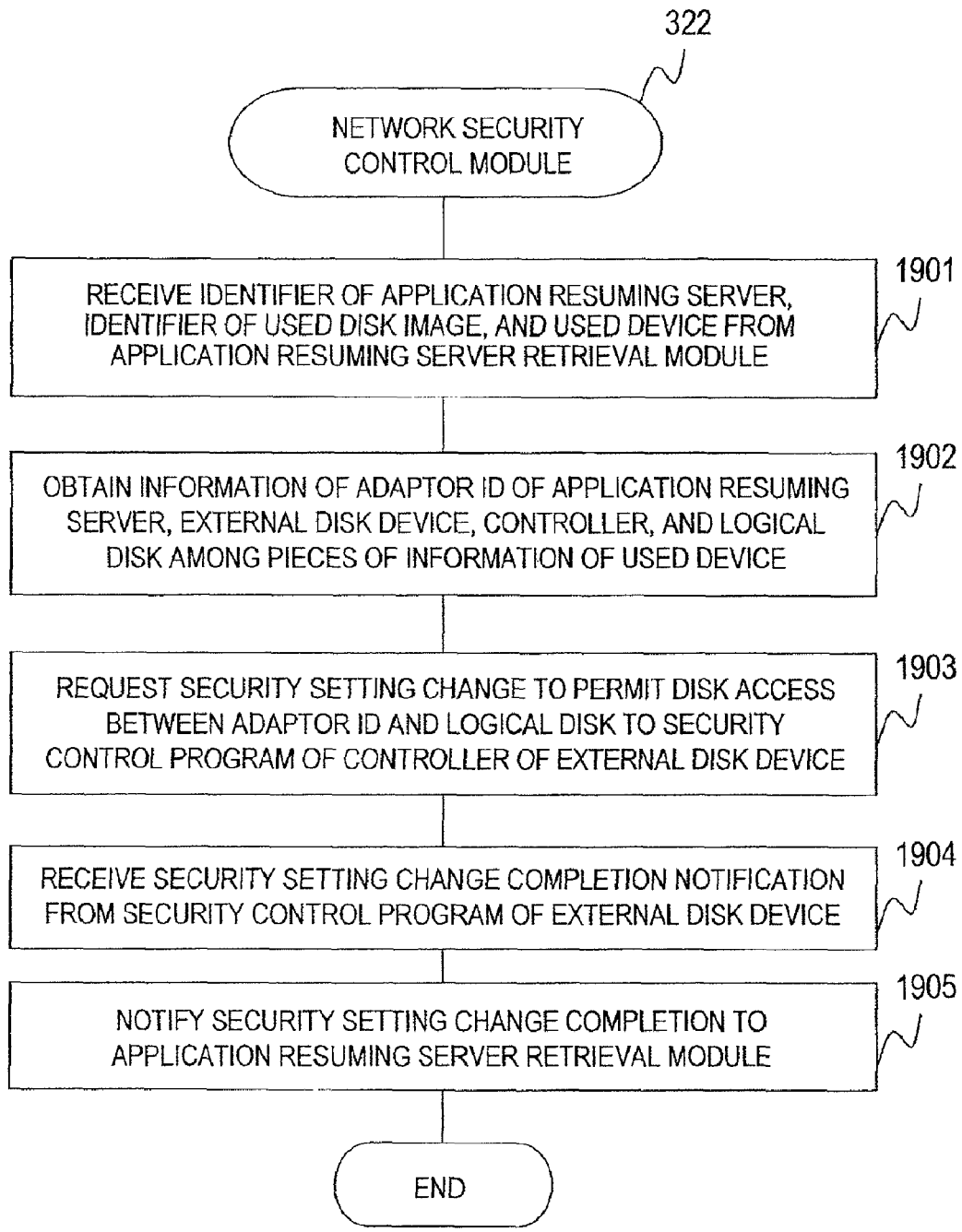
FIG. 19 is a flowchart showing network security control executed by the boot path redundancy program according to the first embodiment of this invention.

FIG. 19 is a flowchart showing network security control executed by the booth path redundancy program 111 according to the first embodiment 20 of this invention.

Processing shown in FIG. 19 is executed by the network security control module 322 in the step 1341 of FIG. 13.

First, the network security control module 322 receives an identifier of the application resuming server 1302, a used disk identifier, and an identifier of a used device from the application resuming server retrieval module 303 (step 1901). These pieces of information have been transmitted in the step 1705 of FIG. 17. The used device is a device of the computer system used by the application resuming server 1302 for resuming the application. For example, the used device is specified based on a combination of the devices indicated by the columns 405 to 408 of the server information table 306 shown in FIG. 4.

Next, the network security control module 322 obtains information of the adaptor ID of the application resuming server 1302, the external disk device 103, the controller 130, and the logical disk among pieces of information of the used device (step 1902).

The network security control module 322 requests the security control program of the controller 130 of the external disk device 103 obtained in the step 1902 to permit disk access with the adaptor ID and the logical disk obtained in the step 1902 (step 1903). The security setting changing means changing of a mapping relation registered in the disk mapping table 1132 (refer to FIGS. 11 and 12).

For example, in FIG. 11, it is presumed that the ID 1111 of the adaptor 1110 disposed in the server 1101 is "WV/N0" and the ID 1121 of the adaptor 1120 disposed in the server 1102 is "WWN1". As shown in FIG. 12, the logical disk "LUN0" is mapped in the adaptor "'WWN0", and the logical disk "LUN1" is mapped in the adaptor "WWN1". Accordingly, the server 1101 can only access the logical disk "LUN0" 1130, while the server 1102 can only access the logical disk "LUN1" 1131.

In this case, for example, the network security control module 322 can change a value of a column 1202 corresponding to the logical disk "LUN1" (in column 1201) from "WWN1" to "WWN0" in the disk mapping table 1132 of FIG. 12 by making a request to the security control program. As a result, a adaptor "WWN0" is mapped in the logical disk "LUN1". As a result, the server 101 can access the logical disk "LUN1" 1131. Accordingly, security setting is changed by changing mapping between the logical disk and the adaptor 120.

The security control program of the external disk device 103 that has received the request of the step 1903 executes security setting changing in response to the request. Upon completion of the security setting changing, the security control program notifies the completion to the network security control module 322.

The network security control module 322 receives the security setting changing completion notification from the security control program of the external disk device 103 (step 1904).

Then, the network security control module 322 notifies the security setting changing completion to the application resuming server retrieval module 303 (step 1905).

Thus, the network security control module 322 finishes the processing.

Figure 20:
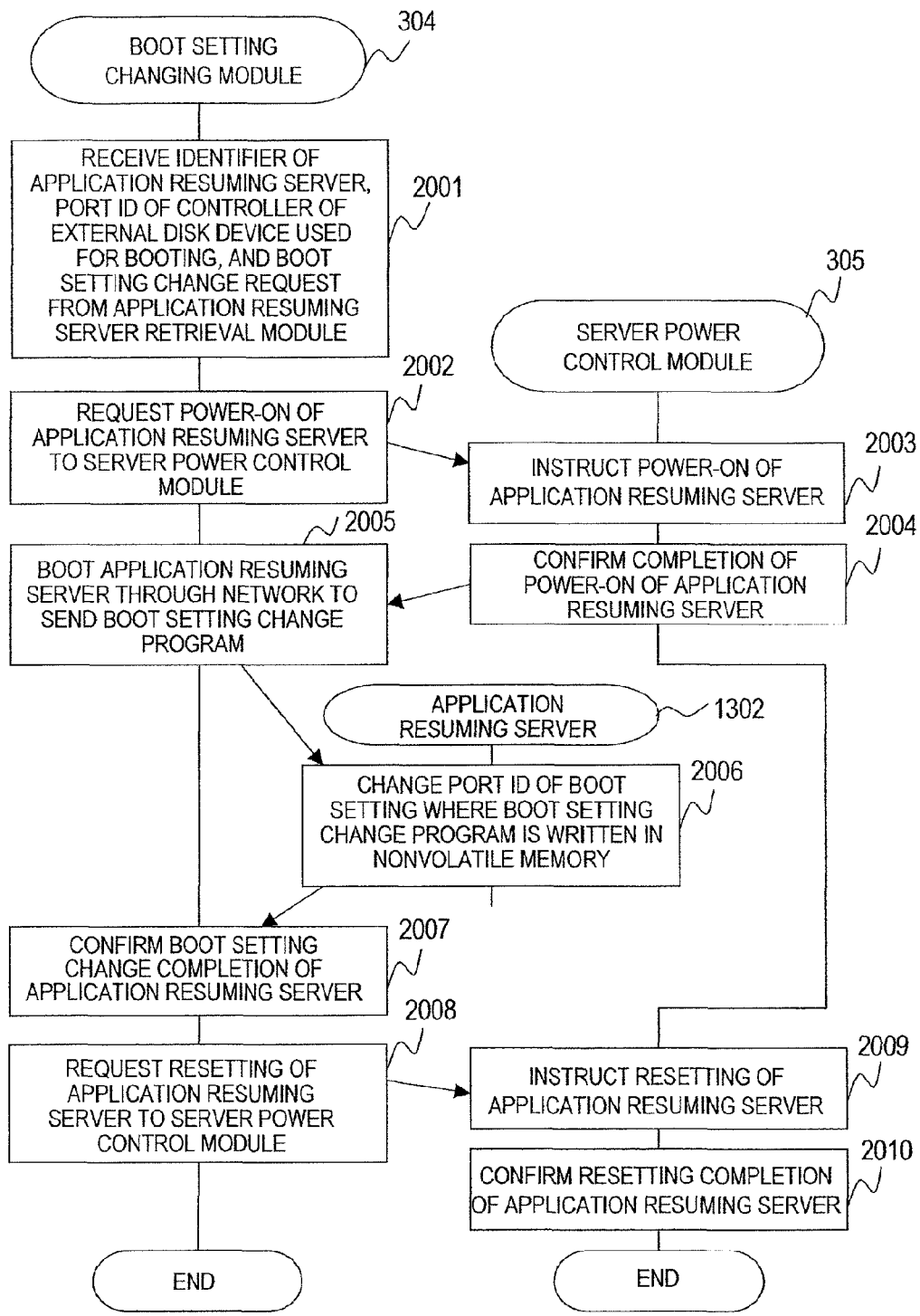
FIG. 20 is a flowchart showing boot setting change and server power control executed by the fault recovery program according to the first embodiment of the this invention.

FIG. 20 is a flowchart showing boot setting changing and server power control executed by the fault recovery program 110 according to the first embodiment of this invention.

Processing of FIG. 20 is executed by the boot setting changing module 304, the server power control module 305, and the application 25 resuming server 1302 in the steps 1334, 1335, and 1320 of FIG. 13.

First, the boot setting changing module 304 receives an identifier of the application resuming server 1302, a port ID of the controller 130 of the external disk device 103 used for booting, and a boot setting changing request from the application resuming server retrieval module 303 (step 2001). These pieces of information have been transmitted in the steps 1707 and 1708 of FIG. 17.

Next, the boot setting changing module 304 requests the server power control module 305 to turn power ON for the application resuming server 1302 (step 2002).

The server power control module 305 that has received the request of the step 2002 instructs power-ON to the application resuming server 1302 (step 2003). For example, the server power control module 305 transmits a power-ON request to the BMC 205 shown in FIG. 2 via the network. The BMC 205 that has received the request turns power ON for the server.

Then, the server power control module 305 confirms power-ON completion of the application resuming server 1302 (step 2004). Here, it is presumed that the application resuming server 1302 can execute network booting. For example, the NIC 121 disposed in the application resuming server 1302 supports BOOTP or PXE which is a network booting protocol.

Additionally, a booting sequence of a System BIOS or EFI of the application resuming server 1302 is set to boot through network booting when power is turned ON.

Upon confirmation of the power-ON completion in the step 2004, the boot setting changing module 304 receives a network booting request of the application resuming server 1302, boots the application resuming server 1302 through the network, and transmits the boot setting changing program 340 to the application resuming server 1302 (step 2005). For example, the boot setting changing module 304 is a DHCP server or the like. In this case, the boot setting changing module 304 receives the BOOTP protocol transmitted from the application resuming server 1302 via the network, and transmits the OS and the boot setting changing program necessary for booting to the application resuming server 1302 by a method of tFTP or the like. The application resuming server 1302 uses the boot setting program 340 to boot.

The application resuming server 1302 executes the boot setting changing program 340 received from the boot setting changing module 304 to change a port ID of boot setting written in the nonvolatile memory 203 of the application resuming server 1302 (step 2006). For example, the port ID of the boot setting is a WWN of a connection destination used by a host bus adaptor (HBA) for booting when the adaptor 120 is an HBA of a fibre channel. When the adaptor 120 is a NIC of iSCSI, the port ID is an IP address or a MAC address used for booting. The port ID of the boot setting may be stored in the nonvolatile memory (not shown) of the adaptor 120.

The boot setting changing module 304 receives a boot setting changing completion notification of the application resuming server 1302 from the boot setting changing program 340 to confirm boot setting changing completion (step 2007).

The boot setting changing module 304 requests the server power control module 305 to reset the application stop server 1302 (step 2008).

Then, the processing of the boot setting changing module 304 is finished.

The server power control module 305 that has received the request of the step 2008 sequentially executes power-OFF and power-ON of the application resuming server 1302 to reset the application resuming server 1302 (step 2009). Alternatively, the boot setting changing program 340 may automatically reset it when the boot setting changing is completed.

Then, the server power control module 305 confirms resetting completion of the application resuming server 1302 (step 2010). After the resetting execution, the application resuming server 1302 uses the disk of the external disk device 103 to boot without network booting. As methods for not executing network booting, for example, there are a method where the boot setting changing program 340 changes booting sequence setting of the system BIOS or the EFI, a method where the boot setting changing module 304 ignores the network booting request, and a method of sending a command to the BMC 205 of the application resuming server 1302 to change the booting sequence.

According to the first embodiment, the device of the computer system is divided into two. Thus, even when a certain server 102 can no longer continue the application as a result of a fault in a certain device, the fault-free server 102 can resume the application by using the fault-free device to boot. The server 102 which is unable to continue the application due to the fault is judged, the server 102 to take over the application and the device to be used by the server 102 is judged, and the processing for booting the server 102 is automatically executed by the management server 101. Hence, it is possible to reduce a work load in the system manager.

Next, a second embodiment of this invention will be described.

The second embodiment of this invention is different from the first embodiment in that the disk synchronization program shown in FIG. 9 is not present. Only differences of the second embodiment from the first embodiment will be described below.

Figure 21:
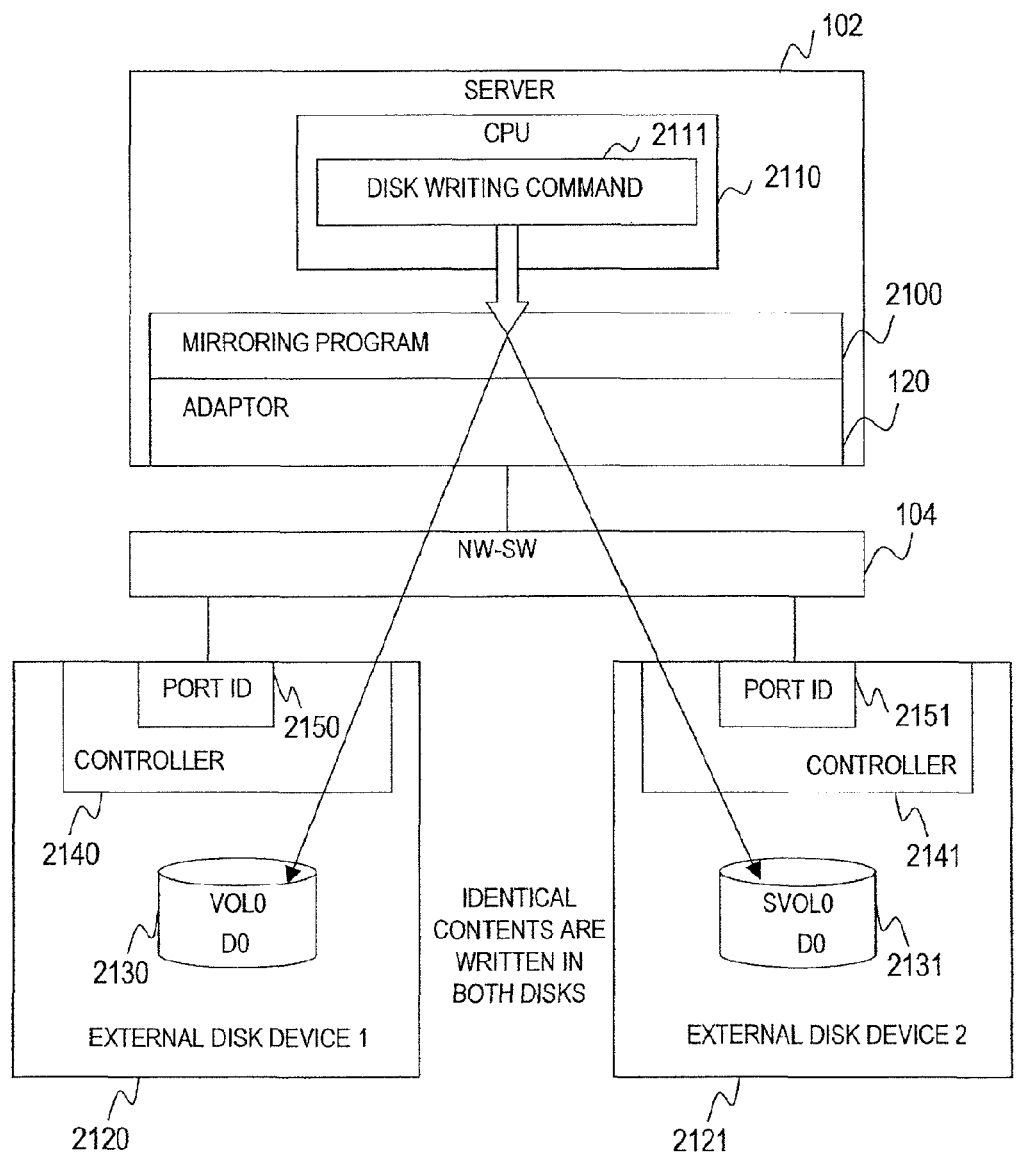
FIG. 21 is an explanatory diagram showing mirroring executed according to a second embodiment of this invention.

FIG. 21 is an explanatory diagram showing mirroring executed according to the second embodiment of this invention.

To be specific, FIG. 21 shows a method of synchronizing contents of disks 2130 and 2131 between two different external disk devices 2120 and 10 2121, and storing the same disk image D0.

A sever 102 of this embodiment includes a mirroring program 2100.

When a CPU 2110 executes a writing command 2111 to write data in a disk 2130, the mirroring program 2100 writes data in the disk 2130 and the same data in a disk 2131. Accordingly, updating of the disk 2130 by the server 102 is always applied to the disk 2131, and the disks 2130 and 2131 match each other in contents.

The mirroring program 2100 may be a resident program such as a demon or a service held in a memory 201 of the server 102 or a program of a driver or the like. In this case, the mirroring program 2100 is executed by the CPU 2110. Alternatively, a function of the mirroring program 2100 may be realized by hardware provided in an adaptor 120. In any case, when the CPU 2110 issues a data writing command in one disk 2130, the adaptor 120 transmits a writing command in the two disks 2130 and 2131.

Otherwise, the mirroring program 2100 (or hardware having the same function) may be present outside the server 102. In this case, the mirroring program 2100 may create one or more pieces of copy data of data output from the adaptor 120 of the server 102, and transmit the pieces of original data and copy data to different external disk devices 103.

A management server 101 can control a start or a stop of 5 synchronization of the disk 2130 or the like by controlling the mirroring program 2100 via a network.

Devices of the computer system of the second embodiment of this invention execute processing according to the sequence shown in FIG. 13 as in the case of the first embodiment. However, processing of a step 1340 of the second embodiment is different from that of the first embodiment. Differences will be described below.

Figure 22:
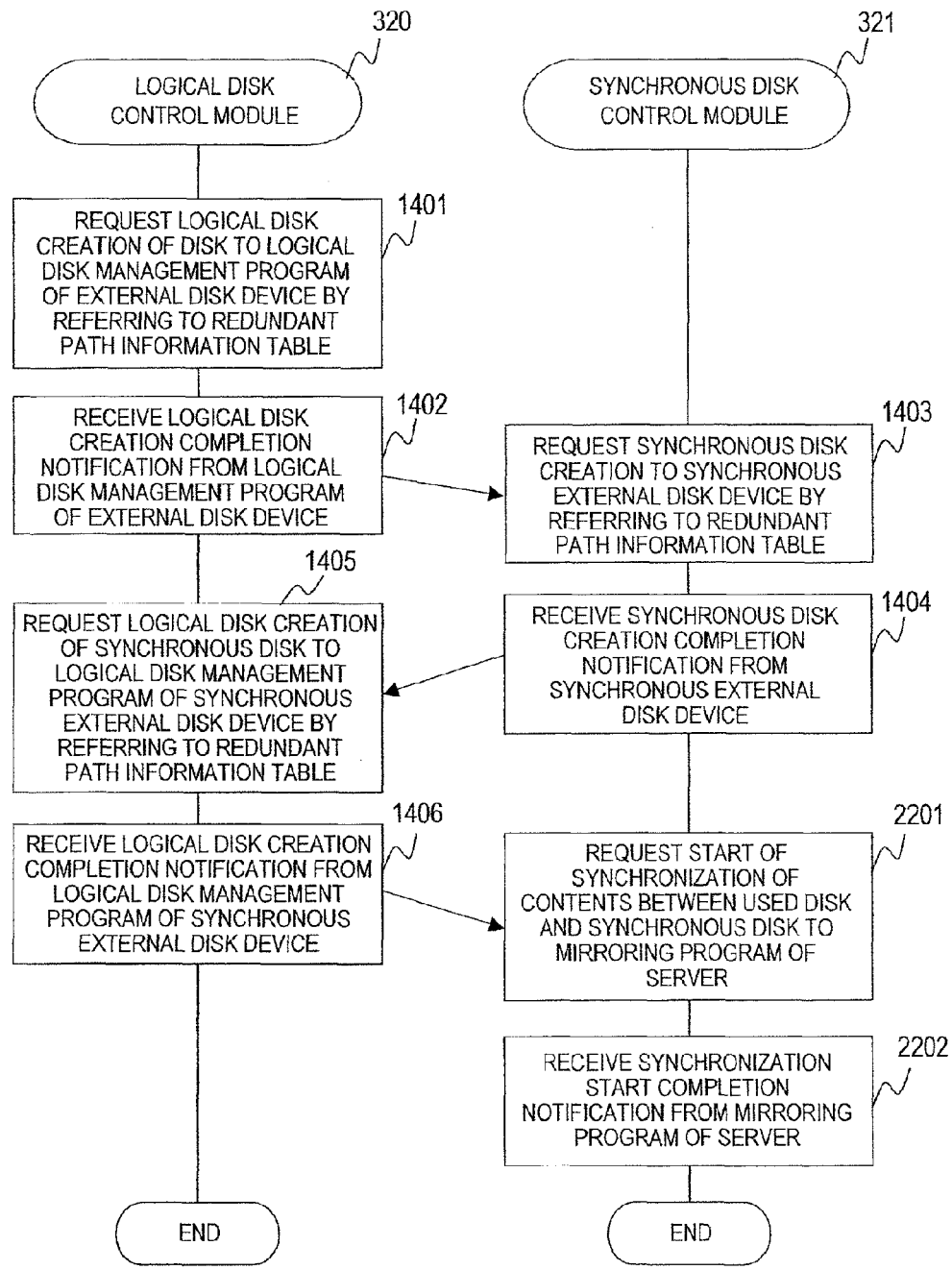
FIG. 22 is a flowchart showing redundancy of a boot path executed by a boot path redundancy program according to the second embodiment of this invention.

FIG. 22 is a flowchart showing redundancy of a boot path executed by a boot redundancy program 111 according to the second embodiment of this invention.

To be specific, FIG. 22 shows processing executed by a logical disk control module 320 and a synchronous disk control module 321 in the step 1340 of FIG. 13 according to the second embodiment.

The processing of FIG. 22 is substitution of the steps 1407 and 1408 of FIG. 14 with steps 2201 and 2202. Steps 1401 to 1406 of FIG. 22 are similar to the steps 1401 to 1406 of FIG. 14, and thus description thereof will be omitted.

In the step 2201, the synchronous disk control module 321 requests the mirroring program 2100 of the server 102 shown in FIG. 21 to start synchronization of contents between the disk 2130 used by an application stop server 1301 and the synchronous disk 2131 present in another external disk device 2121. The mirroring program 2100 that has received the request starts synchronization between the disks to notify synchronization start completion to the synchronous disk control module 321. Then, when the CPU 2110 issues a data writing command in one disk 2130, the adaptor 120 transmits a writing command in the two disks 2130 and 2131.

In the step 2202, the synchronous disk control module 321 receives the synchronization start completion notification from the mirroring program 2100 of the server 102 shown in FIG. 21.

Next, a third embodiment of this invention will be described.

The third embodiment of this invention is different from the first embodiment in that the disk synchronization program shown in FIG. 9 is not present, and from the second embodiment in that the mirroring program shown in FIG. 21 is not present.

Figure 23:
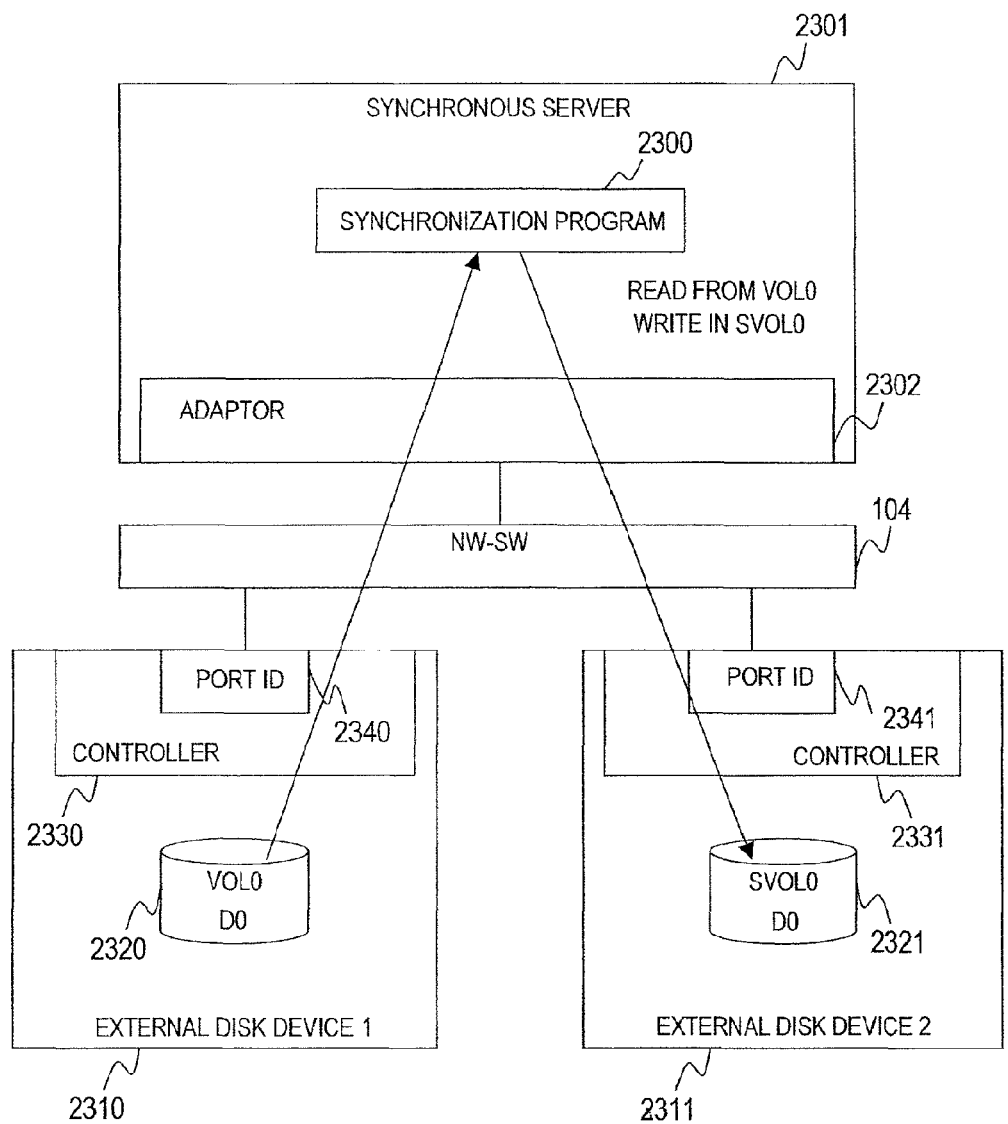
FIG. 23 is an explanatory diagram showing creation of a synchronous disk executed according to a third embodiment of this invention.

FIG. 23 is an explanatory diagram showing synchronous disk creation executed according to the third embodiment of this invention.

To be specific, FIG. 23 shows a method of synchronizing contents of disks 2320 and 2321 between two different external disk devices 2310 and 2311 to store the same disk image D0 according to this embodiment.

According to this embodiment, one of serves 102 of a computer system becomes a synchronous server 2301. The synchronous server 2301 includes a synchronization program 2300. The synchronous server 2301 may be a server 102 engaged in application or not engaged in application. The synchronous server 2301 can access disks 2320 and 2321 via an adaptor 2302 and the NW-SW 104. The synchronization program 2300 periodically reads contents of the disk 2320, and writes the read contents in the disk 2321 to synchronize the contents of the two disks 2320 and 2321. As a result, when the server 102 in the computer system updates the contents of the disk 2320, the synchronization program 2300 updates the contents of the disk 2321.

The synchronization program 2300 may be a resident program such as a demon or a service stored in a memory 201 of the synchronous server 2301, or a program of a driver or the like. In this case, the synchronization program 2300 is executed by a CPU 202. Alternatively, a function of the synchronization program 2300 may be realized by hardware provided in an adaptor 2302.

A management server 101 can control a start or a stop of disk synchronization by controlling the synchronization program 2300 via a network.

Devices of the computer system of the third embodiment of this invention execute processing according to the sequence shown in FIG. 13 as in the case of the first embodiment.

However, processing of a step 1340 of the third embodiment is different from that of the first embodiment. The differences will be described below.

Figure 24:
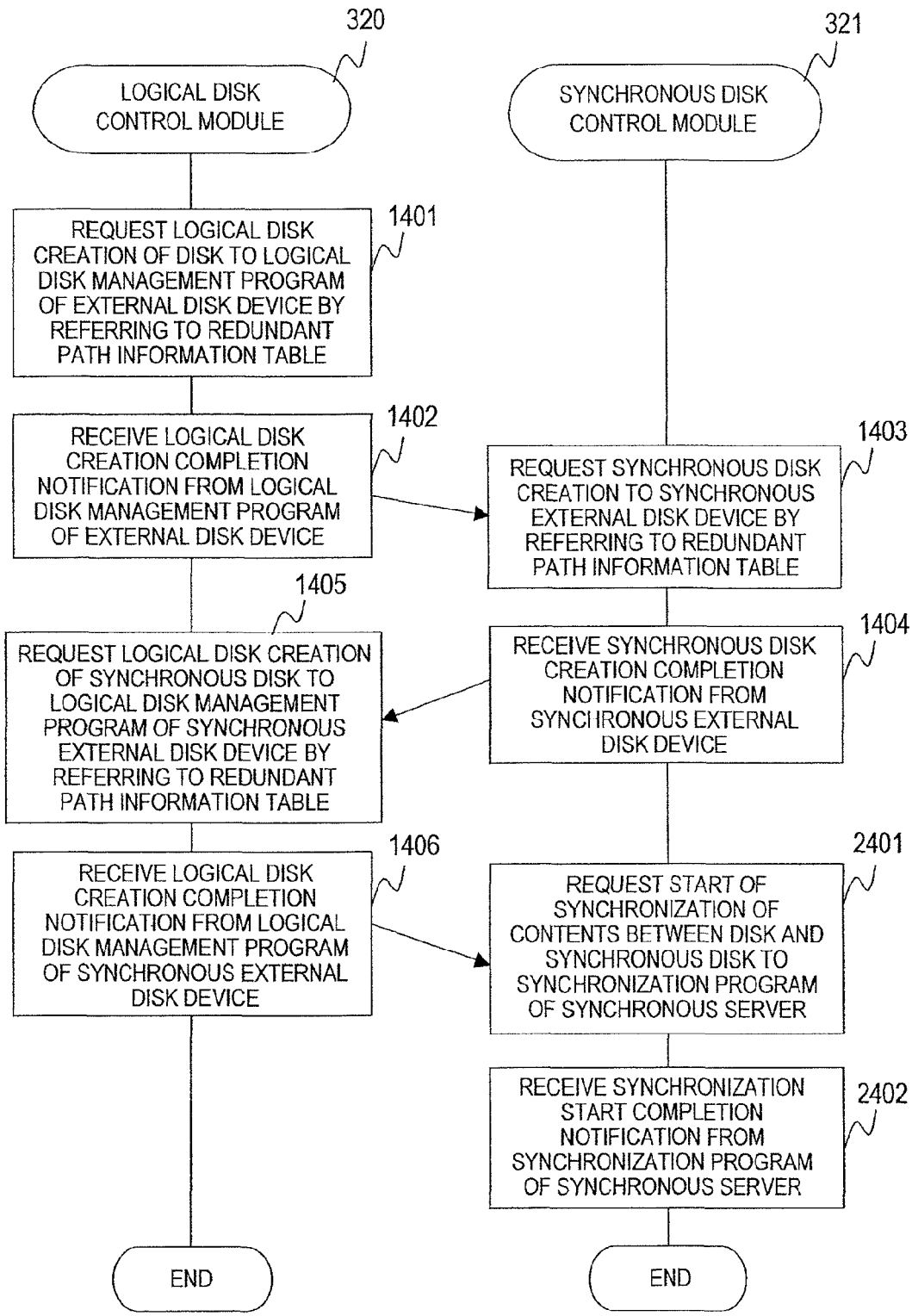
FIG. 24 is a flowchart showing redundancy of a boot path executed by a boot path redundancy program according to the third embodiment of this invention.

FIG. 24 is a flowchart showing redundancy of a boot path executed 20 by a boot redundancy program 111 according to the third embodiment of this invention.

To be specific, FIG. 24 shows processing executed by a logical disk control module 320 and a synchronous disk control module 321 in the step 1340 of FIG. 13 according to the third embodiment.

The processing of FIG. 24 is substitution of the steps 1407 and 1408 of FIG. 14 with steps 2401 and 2402. Steps 1401 to 1406 of FIG. 24 are similar to the steps 1401 to 1406 of FIG. 14, and thus description thereof will be omitted.

In the step 2401, the synchronous disk control module 321 requests the synchronization program 2300 of the synchronous server 2301 shown. in FIG. 23 to start synchronization of contents between the disk 2320 used by an application stop server 1301 and the synchronous disk 2131 of another external disk device 2311. The synchronization program 2300 that has received the request starts synchronization between the disks to notify synchronization start completion to the synchronous disk control module 321. Then, the synchronization program 2300 is executed.

In the step 2402, the synchronous disk control module 321 receives the synchronization start completion notification from the synchronization program 2300 of the synchronous server 2301 shown in FIG. 23.

According to the second and third embodiments, even when the external disk device 103 has no function of creating a synchronous disk, this invention can be carried out by using the server 102 to create a synchronous disk.

Next, a fourth embodiment of this invention will be described.

According to the first to third embodiments, the controller 130 of the external disk device 103 includes the security control program. The security control program controls permission or inhibition of access to the disk 131 from the server 102. However, such access permission/inhibition may be controlled by a function provided in the network. For example, the function provided in the network is a virtual LAN (VLAN) function or a zoning function.

According to the fourth embodiment of this invention, a controller 140 of a NW-SW 104 includes a security control program.

FIG. 25 is an explanatory diagram showing a server information table 5 306 according to the fourth embodiment of this invention.

The server information table 306 shown in FIG. 25 is an extension of the server information table 306 of FIG. 4 to be applied to this embodiment. An extended part is a column 410. As columns 401 to 408 are similar to the columns 401 to 408 of FIG. 4, description thereof will be omitted. Contents of the columns 407 and 408 are omitted, but contents similar to the contents of the columns 407 and 408 of FIG. 4 are registered in those columns.

In the column 410, a port number of a physical port of a connection destination is registered when an adaptor 120 identified by an adaptor ID indicated by the column 405 is connected to the physical port of a NE-SW 104 of the connection destination indicated by the column 406.

Referring to FIG. 25, for example, an adaptor "WWN0" is connected to a port "0" of a NE-SW "SW0", and an adaptor "WWN1" is connected to a port "1" of the NW-SW "SW0".

FIG. 26 is an explanatory diagram showing an external disk device information table 307 according to the fourth embodiment of this invention.

The external disk device information table 307 of FIG. 26 is an extension of the external disk device information table 307 shown in FIG. 5 to be applied to this embodiment. Extended parts are columns 510 and 511. As columns 501 to 503 are similar to the columns 501 to 503 shown in FIG. 5, description thereof will be omitted.

In the column 510, an identifier of the NW-SW 104 of the connection destination of the physical port identified by a port ID indicated by the column 503 is registered.

In the column 511, a port number of the physical port of the NW-SW 104 of the connection destination is registered when the physical port indicated by the port ID indicated by the column 503 is connected to the physical port of the NW-SW 104 indicated by the column 510.

Figure 27:
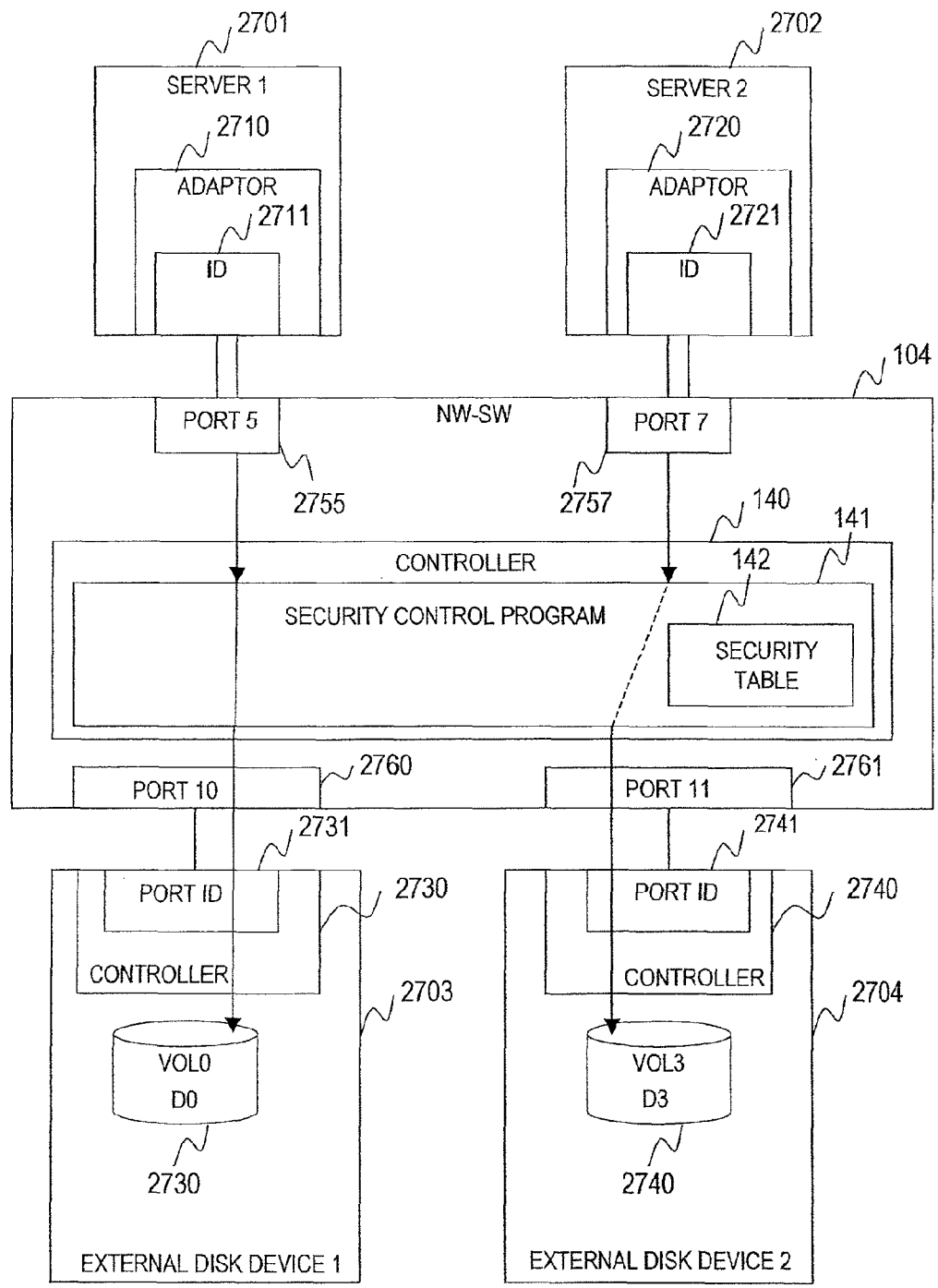
FIG. 27 is an explanatory diagram showing security control executed by NW-SW according to the fourth embodiment of this invention.

FIG. 27 is an explanatory diagram showing security control executed by the NW-SW 104 according to the fourth embodiment of this invention.

To be specific, FIG. 27 shows an outline of processing executed by a security control program 141 of the NW-SW 104 according to this embodiment. The controller 140 of the NW-SW 104 includes the security control program 141. The security control program 141 is, for example, a program for realizing a port VLAN function, a tag VLAN function, a zoning function, or the like. The security control program 141 is stored in a memory (not shown) of the controller 140 to be executed by a CPU (not shown) of the controller 140.

The security control program 141 can limit a combination of 20 communicable ports by designating a number of a physical port 2755 or the like disposed in the NW-SW 104.

In an example of FIG. 27, a port identified by an ID 2711 of an adaptor 2710 disposed in a server 2701 is connected to a port 5 (2755) of the NW-SW 104. A port identified by an ID 2721 of an adaptor 2720 disposed in a server 2702 is connected to a port 7 (2757) of the NW-SW 104. An external disk device 2703 is connected to a port 10 (2760) of the NW-SW 104. An external disk device 2704 is connected to a port 11 (2761) of the NW-SW 104.

It is presumed that the security control program 141 permits communication between the ports 5 and 10, and communication between the ports 7 and 11. In this case, communication can be carried out between the permitted ports. As communication is not permitted between the ports 5 and 11, the server 2701 cannot access a disk 2740.

The controller 140 stores a security table 142. In the security table 142, a combination of communicable ports of the NW-SW 104 is registered (refer to FIG. 28). The security table 142 is stored in a memory (not shown) of the controller 140.

The security control program 141 can control a communicable combination by designating ID's 2711 and 2721 of adaptors connected to the NW-SW 104 or port ID's to 2731 and 2732 of external disk devices 2703 and 2704 to permit or inhibit communication in place of designating a combination of port numbers of the NW-SW 104.

Figure 28:
FIG. 28 is an explanatory diagram showing a security table according to the fourth embodiment of this invention.

FIG. 28 is an explanatory diagram showing the security table 142 according to the fourth embodiment of this invention.

A column 2801 indicates a group ID of security. The group ID is, for example, an ID of VLAN, an identifier of a zone in zoning, or the like.

A column 2802 indicates a combination of port numbers of the NW-SW 104 belonging to the group indicated by the column 2801. Communication can be carried out between the port numbers belonging to the same group.

In an example of FIG. 28, in the column 2801, "A", "B", and "C" are registered as security group ID's. In the column 2802, "5, 10", "7, 11", and "9, 12" are respectively registered corresponding to the security group ID's "A", "B", and "C". This means that the ports 5 and 10 belong to the same security group A, the ports 7 and 11 belong to the same security group B, and the ports 9 and 12 belong to the same security group C.

The security control group 141 permits communication between the ports belonging to the same group. Thus, while communication can be carried out between the ports belonging to the same group, communication cannot be carried out between ports belonging to different groups. In other words, as shown in FIG. 27, the sever 2701 connected to the port 5 can access the logical volume "VOL0" of the external disk device 2703 connected to the port 10, but not the logical volume "VOL3" of the external disk device 2704 connected to the port 11.

In the column 2802, in place of the port numbers of the NW-SW 104, an ID of the adaptor 120 connected to the NW-SW 104 and an ID of the controller 130 of the external disk device 103 may be registered.

Devices of the computer system of the fourth embodiment of this invention execute processing according to the sequence shown in FIG. 13 as in the case of the first embodiment. However, processing of a step 1341 of the fourth embodiment is different from that of the first embodiment. The differences will be described below.

Figure 29:
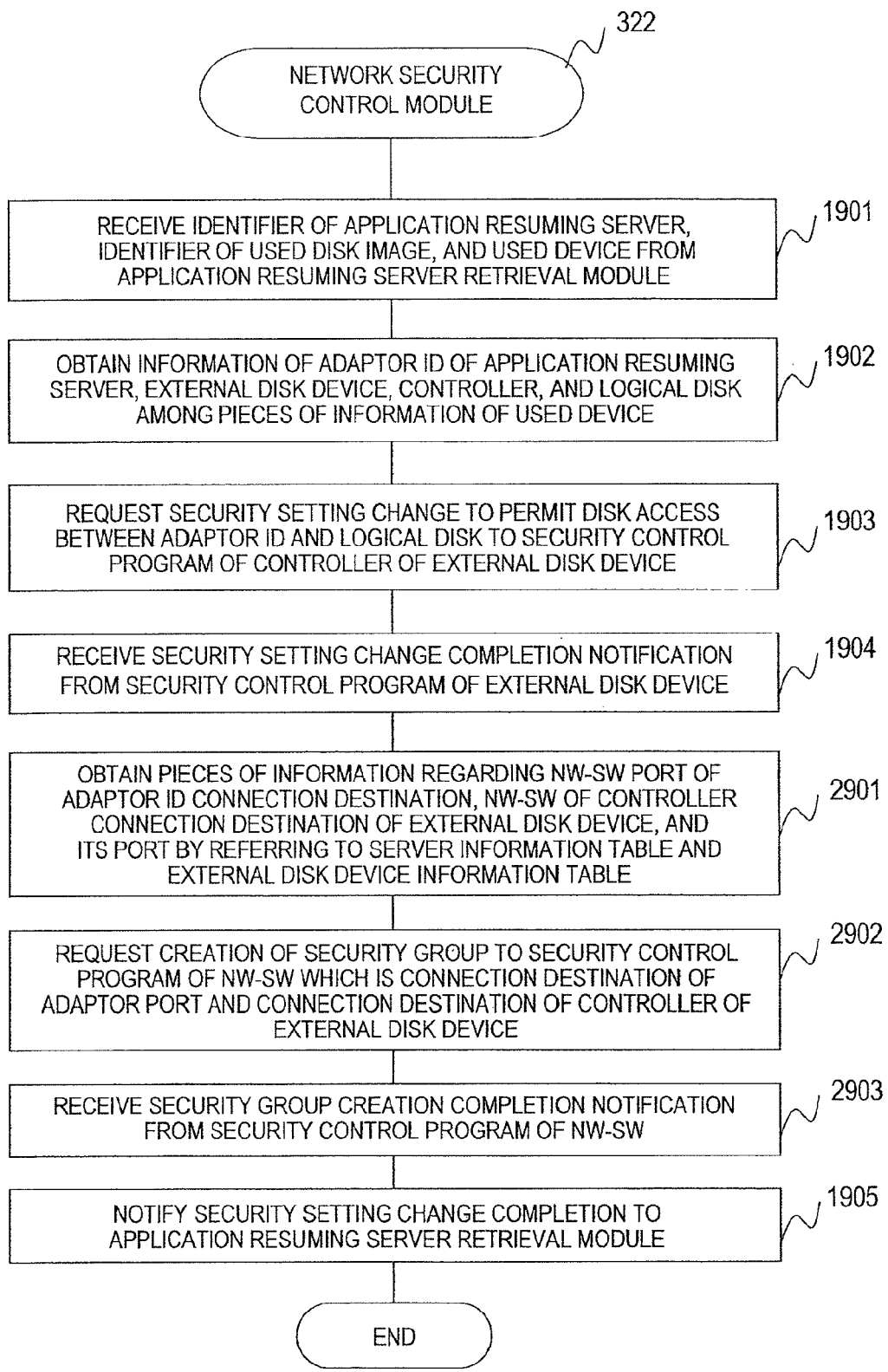
FIG. 29 is a flowchart showing network security control executed by a boot path redundancy program according to the fourth embodiment of this invention.

FIG. 29 is a flowchart showing network security control executed by a boot redundancy program 111 according to the fourth embodiment of this 25 invention.

To be specific, FIG. 29 shows processing executed by a network security control module 322 in the step 1341 of FIG. 13 according to the fourth embodiment.

The processing of FIG. 29 is an addition of steps 2901 to 2903 between the steps 1904 and 1905 of FIG. 19. Steps 1901 to 1905 of FIG. 29 are similar to the steps 1901 to 1905 of FIG. 19, and thus description thereof will be omitted.

The network security control module 322 of this embodiment executes the step 2901 after execution of the step 1904.

In the step 2901, the network security control module 322 refers to the service information table 306 (of FIG. 25) and the external disk device information table 307 (of FIG. 26). The network security control module 322 obtains an identifier (registered in column 406) of the connection destination NW-SW 104 of the adaptor port of the application resuming server 1302 and an identifier (registered in column 410) of the physical port of the connection destination. Additionally, the network security control module 322 obtains an identifier (registered in column 510) of the connection destination NW-SW 104 of the port disposed in the controller 130 of the external disk device 103 obtained in the step 1902, and an identifier (registered in column 511) of the physical port of the connection destination.

Then, in the step 2902, the network security control module 322 requests the security control program 141 of the NW-SW 104, which is the connection destination of the adaptor port of the application resuming server 1302 obtained in the step 2901 and the connection destination of the port disposed in the controller 130 of the external disk device 103 obtained in the step 1902, to create a security group to which the physical port obtained in the step 2901 belongs. For example, when the identifier of the NW-SW 104 registered in the column 406 of the server information table 306 (of FIG. 25) is identical to that of the NW-SW 104 registered in the column 510 of the external disk information table 307 (of FIG. 26), the port number registered in the column 410 and the port number registered in the column 511 belong to the same security group.

The security control program 141 of the NW-SW 104 that has received the request updates the security group 142 in response to the request. Then, the security control program 141 sends a completion notification of security group creation to the network security control module 322.

In the step 2903, the network security control module 322 receives the security group creation completion notification from the security control 15 program 141 of the NW-SW 104.

Then, the step 1905 is executed to finish the processing.

According to the fourth embodiment, when the network has a VLAN function or a zoning function, this invention can also be carried out.

Next, a fifth embodiment of this invention will be described.

According to the first embodiment of this invention, the security control program 1103 of the external disk device 103 sets the disk mapping table 1132 to permit or inhibit access to the disk 131 from the server 102. However, if the adaptor ID of the server 102 is changed, it is possible to control permission or inhibition of access of the sever 102 without changing setting of the external disk device 103 side. According to the fifth embodiment of this invention, as described above, security is controlled by changing the setting of the server 102.

Figure 30:
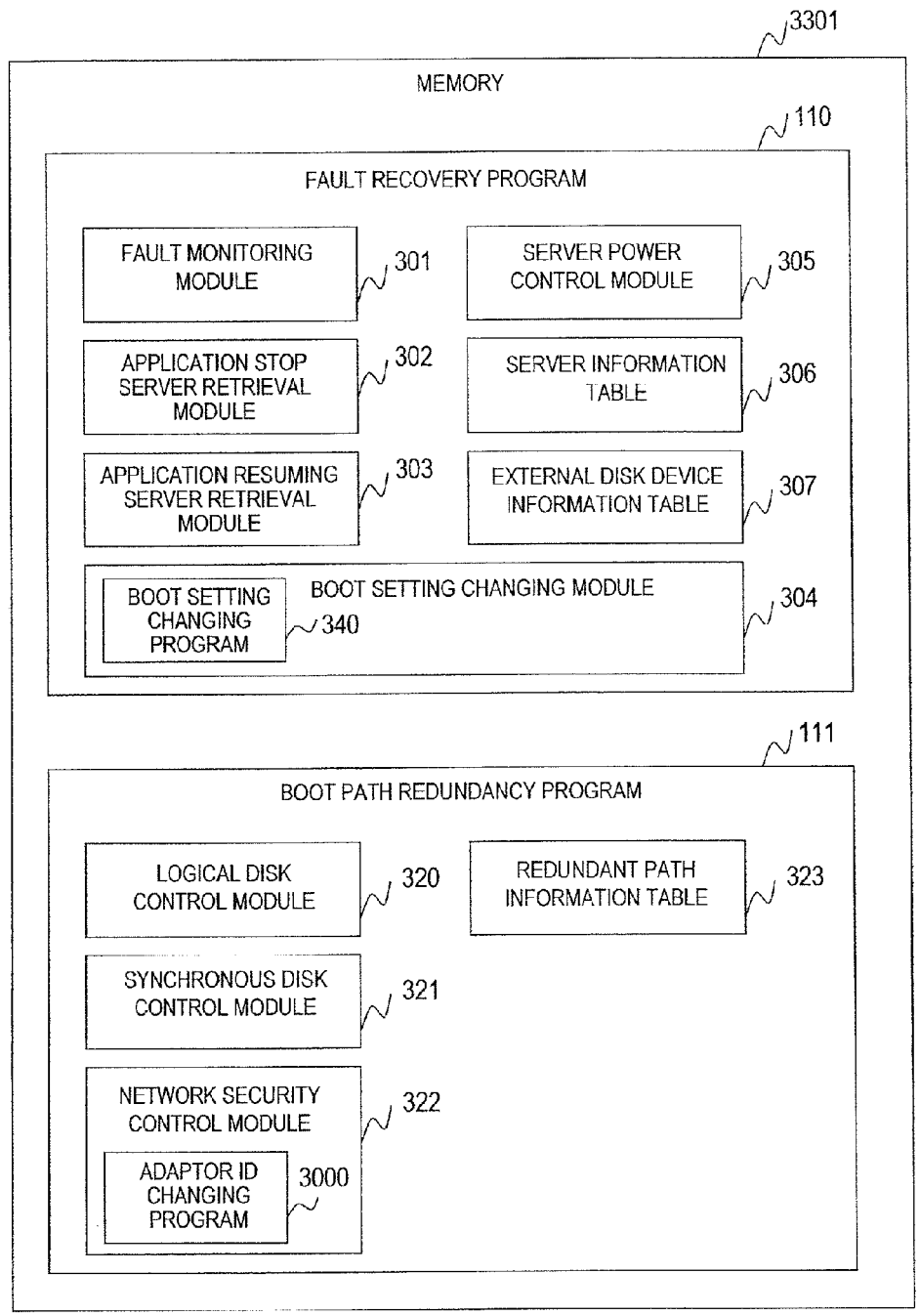
FIG. 30 is an explanatory diagram showing a fault recovery program 5 and a boot path redundancy program in detail according to a fifth embodiment of this invention.

FIG. 30 is an explanatory diagram showing the fault recovery program 110 and the boot path redundancy program 111 in detail according to the fifth embodiment of this invention.

As shown in FIG. 30, the fault recovery program 110 of this embodiment is the same as the fault recovery program 110 (refer to FIG. 3) of the first embodiment. The boot path redundancy program 111 of this embodiment is similar to the boot path redundancy program 111 (refer to FIG. 3) of the first embodiment except for the fact that the network security control module 322 of this embodiment includes an adaptor ID changing program 3000. The adaptor ID changing program 3000 is a program for changing the ID of the adaptor 120 disposed in the server 102.

Devices of the computer system of the fifth embodiment of this invention execute processing according to the sequence shown in FIG. 13 as in the case of the first embodiment. However, processing of steps 1333, 1334, and 1341 of the fifth embodiment are different from those of the first embodiment. The differences will be described below.

Figure 31:
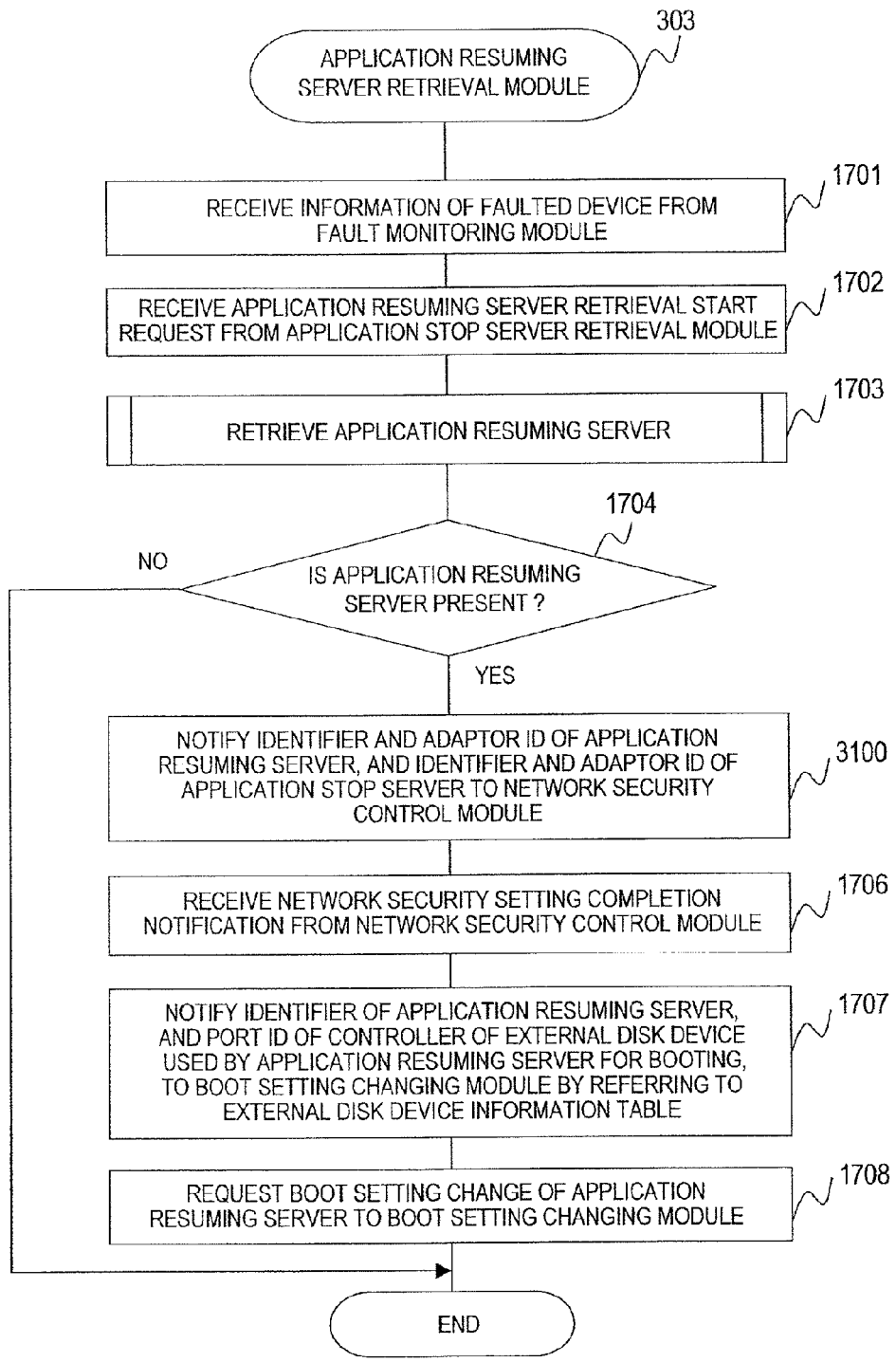
FIG. 31 is a flowchart showing application resuming server retrieval executed by the fault recovery program according to the fifth embodiment of this invention.

FIG. 31 is a flowchart showing application resuming server retrieval 20 executed by the fault recovery program 110 according to the fifth embodiment of this invention.

Processing shown in FIG. 31 is processing executed by the application resuming server retrieval module 303 of this embodiment in the steps 1333 and 1334 of FIG. 13.

The processing of FIG. 31 is substitution of the step 1705 of FIG. 17 with a step 3100. Steps 1701 to 1704 and steps 1706 to 1708 of FIG. 31 are similar to the steps 1701 to 1704 and steps 1706 to 1708 of FIG. 17, and thus description thereof will be omitted.

In the step 3100, the application resuming server retrieval module 303 notifies an identifier of the application resuming server 1302, an ID of the adaptor 120 of the application resuming server 1302, an identifier of the application stop server 1301, and an ID of the adaptor of the application stop server 1301 to the network security control module 322.

Figure 32:
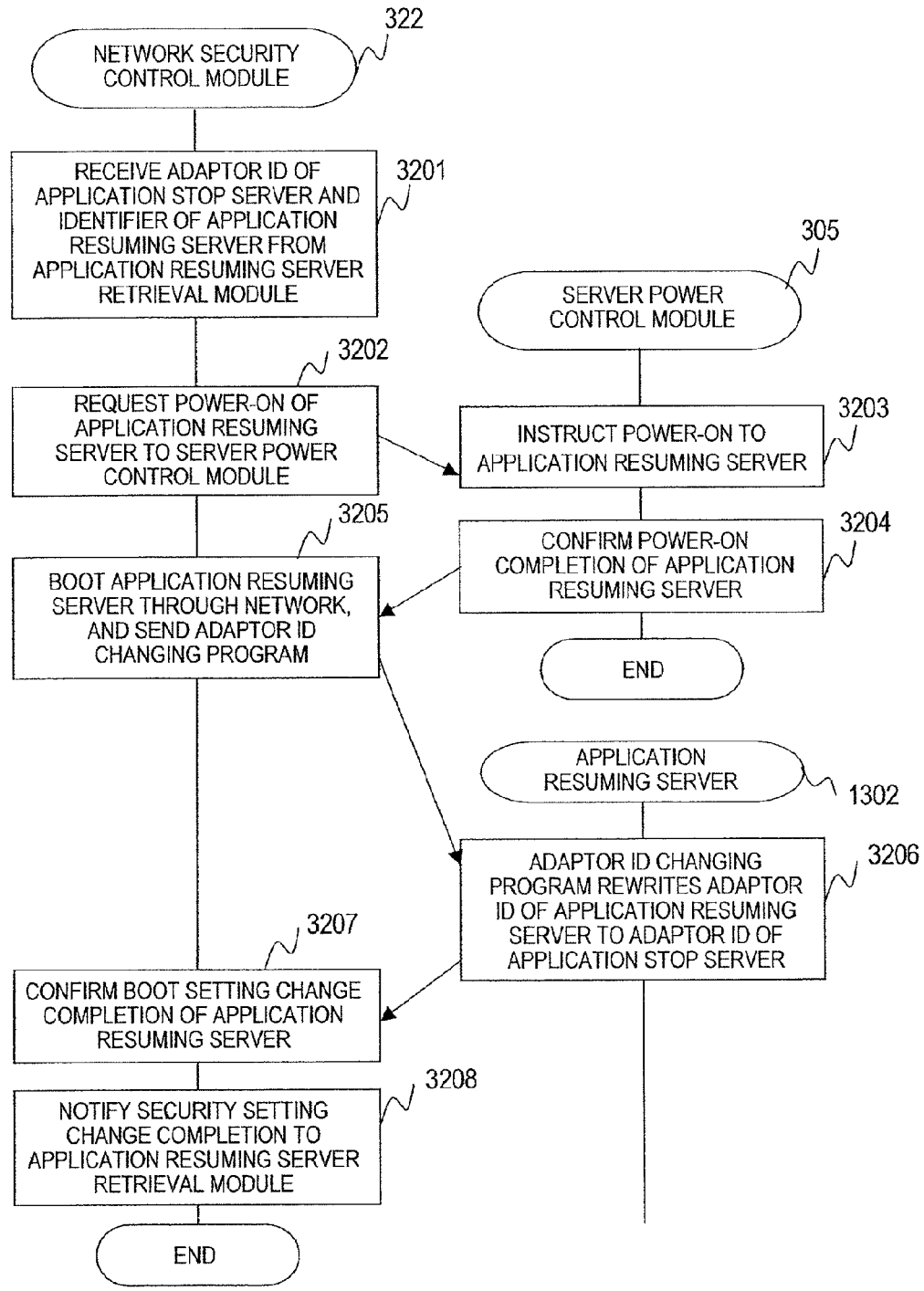
FIG. 32 is a flowchart showing network security control executed by the boot path redundancy program according to the fifth embodiment of this invention.

FIG. 32 is a flowchart showing network security control executed by the boot path redundancy program 111 according to the fifth embodiment of this invention.

Processing shown in FIG. 32 is processing executed by the network security control module 322, the server power control module 305, and the application resuming server 1302 of this embodiment in the step 1341 of FIG. 13.

First, the network security control module 322 receives an identifier of the application resuming server 1302, an ID of the adaptor of the application resuming server 1302, an identifier of the application stop server 1301, and an ID of the adaptor of the application stop server 1301 from the application resuming server retrieval module 303 (step 3201).

Then, the network security control module 322 requests the server power control module 305 to turn power ON for the application resuming server 1302 (step 3202).

The server power control module 305 that has received the request in 25 the step 3202 turns power ON for the application resuming server 1302 (step 3203).

Then, the server power control module 305 confirms power-ON completion of the application resuming server 1302 (step 3204). The application resuming server 1302 is, for example, set to boot through the network by a method of PXE or the like.

Then, the network security control module 322 boots the application resuming server 1302 through the network, and transmits the adaptor ID changing program 3000 to the application resuming server 1302 (step 3205). In this case, for example, the network security control module 322 is operating a program corresponding to network booting of DHCP or the like, and can send the adaptor ID changing program 3000 to the application resuming server 1302 by a tftp method or the like.

The application resuming server 1302 executes the received adaptor ID changing program 3000 (step 3206). As a result, the ID of the adaptor 120 of the application resuming server 1302 obtained in the step 3201 is rewritten with an ID of the adaptor 120 of the application stop server 1301. For example, the adaptor 120 itself may include an ID rewriting function, and the adaptor ID changing program 3000 may use this function to rewrite the ID. Alternatively, the adaptor ID changing program 3000 may directly rewrite a file or data storing the ID.

Then, the network security control module 322 confirms boot setting changing completion of the application resuming server 1302 (step 3207).

Then, the network security control module 322 notifies the security setting changing completion to the application resuming retrieval module 303 (step 3208).

Then, the processing of FIG. 32 is finished.

According to the fifth embodiment of this invention, the invention can be carried out without changing the security setting of the network side or the external disk device 103 side.

According to this embodiment of this invention, reliability of the computer system is improved. Further, as the servers can access the same disk image via a plurality of independent networks, the servers that use the networks can realize parallel data processing. As a result, there is an effect of achieving a high speed for processing of the computer system.

While the present invention has been described in detail and pictorially in the accompanying drawings, the present invention is not limited to such detail but covers various obvious modifications and equivalent arrangements, which fall within the purview of the appended claims.

What is claimed is:

1. A computer system comprising a management server, a plurality of servers engaged in applications, a plurality of network devices, and an external disk device, which are connected to one another,
    wherein the external disk device comprises one or more logical disks,
    wherein the plurality of servers include a first server and a second server,
    wherein the plurality of network devices include a first network device and a second network device,
    wherein the management server comprises:
        a server retrieval module; and
        server information indicating a connection relation among the plurality of the servers, the plurality of network devices, the external disk device, and the one or more logical disks, and
    wherein the server retrieval module is configured to:
        detect state information of the first server;
        identify, when a change in configuration indicated by the state information is detected, based on the server information, the first network device to which the first server is connected; and
        identify, based on the server information, the second server connected to the first network device or the second network device as being in a connection relation with a connection destination of the first network device.

2. The computer system of claim 1 being configured to change security settings of at least one of the plurality of network devices to permit the second server to access the first network device or the second network device.

3. The computer system of claim 1 being configured to:
    stop the first server; and
    boot up the second server.

4. A computer system comprising a management server, a plurality of servers engaged in applications, a plurality of network devices, and an external disk device, which are connected to one another,
    wherein the external disk device comprises a plurality of logical disks,
    wherein the plurality of servers include a first server and a second server,
    wherein the plurality of network devices include a first network device and a second network device,
    wherein the plurality of logical disks include a first logical disk and a second logical disk,
    wherein the management server comprises:
        a server retrieval module; and
        server information indicating a connection relation among the plurality of the servers, the plurality of network devices, the external disk device, and the one or more logical disks, and
    wherein the server retrieval module is configured to:
        detect state information of the first server;
        identify, when a change in configuration indicated by the state information is detected, based on the server information, the first logical disk to which the first server is connected; and
        identify, based on the server information, the second server connected to the first logical disk or the second logical disk as a substitute of the first logical disk.

5. The computer system of claim 4 being configured to change security settings of the external disk device and at least one of the plurality of network devices to permit the second server to access the first logical disk or the second logical disk.

6. The computer system of claim 4 being configured to:
    stop the first server; and
    boot up the second server.

7. The computer system of claim 4 being configured to change security settings of the external disk device and/or at least one of the plurality of network devices to permit the second server to access the first logical disk or the second logical disk and to permit the second server to access the first network device or the second network device.

8. The computer system of claim 1, wherein the server retrieval module is further configured to:

identify, based on the server information, the first logical disk to which the first server is connected; and identify, based on the server information, the second server connected to the first logical disk or the second logical disk as a substitute of the first logical disk.

9. The computer system of claim 8, being configured to:
stop the first server; and
boot up the second server.

10. An apparatus comprising a management server, a plurality of servers engaged in applications, a plurality of network devices, and an external disk device, which are connected to one another,
wherein the external disk device comprises one or more logical disks,
wherein the plurality of servers include a first server and a second server,
wherein the plurality of network devices include a first network device and a second network device,
wherein the management server comprises:
a server retrieval module; and
server information indicating a connection relation among the plurality of the servers, the plurality of network devices, the external disk device, and the one or more logical disks, and
wherein the server retrieval module is configured to:
detect state information of the first server;
identify, when a change in configuration indicated by the state information is detected, based on the server information, the first network device to which the first server is connected; and
identify, based on the server information, the second server connected to the first network device or the second network device as being in a connection relation with a connection destination of the first network device.

11. The apparatus of claim 10 being configured to change security settings of at least one of the plurality of network devices to permit the second server to access the first network device or the second network device.

12. An apparatus comprising a management server, a plurality of servers engaged in applications, a plurality of network devices, and an external disk device, which are connected to one another,
wherein the external disk device comprises a plurality of logical disks,
wherein the plurality of servers include a first server and a second server,
wherein the plurality of network devices include a first network device and a second network device,
wherein the plurality of logical disks include a first logical disk and a second logical disk,
wherein the management server comprises:
a server retrieval module; and
server information indicating a connection relation among the plurality of the servers, the plurality of network devices, the external disk device, and the one or more logical disks, and
wherein the server retrieval module is configured to:
detect state information of the first server;
identify, when a change in configuration indicated by the state information is detected, based on the server information, the first logical disk to which the first server is connected; and
identify, based on the server information, the second server connected to the first logical disk or the second logical disk as a substitute of the first logical disk.

13. The apparatus of claim 12 being configured to change security settings of the external disk device and at least one of the plurality of network devices to permit the second server to access the first logical disk or the second logical disk.

14. The apparatus of claim 12 being configured to change security settings of the external disk device and/or at least one of the plurality of network devices to permit the second server to access the first logical disk or the second logical disk and to permit the second server to access the first network device or the second network device.

15. The apparatus of claim 10, wherein the server retrieval module is further configured to:
identify, based on the server information, the first logical disk to which the first server is connected; and
identify, based on the server information, the second server connected to the first logical disk or the second logical disk as a substitute of the first logical disk.

16. A method in a computer system comprising a management server, a plurality of servers engaged in applications, a plurality of network devices, and an external disk device, which are connected to one another,
wherein the external disk device comprises one or more logical disks,
wherein the plurality of servers include a first server and a second server,
wherein the plurality of network devices include a first network device and a second network device,
wherein the management server comprises:
a server retrieval module; and
server information indicating a connection relation among the plurality of the servers, the plurality of network devices, the external disk device, and the one or more logical disks, and
wherein the method comprises:
detecting state information of the first server;
identifying, when a change in configuration indicated by the state information is detected, based on the server information, the first network device to which the first server is connected; and
identifying, based on the server information, the second server connected to the first network device or the second network device as being in a connection relation with a connection destination of the first network device.

17. A method in a computer system comprising a management server, a plurality of servers engaged in applications, a plurality of network devices, and an external disk device, which are connected to one another,
wherein the external disk device comprises a plurality of logical disks,
wherein the plurality of servers include a first server and a second server,
wherein the plurality of network devices include a first network device and a second network device,
wherein the plurality of logical disks include a first logical disk and a second logical disk,
wherein the management server comprises:
a server retrieval module; and
server information indicating a connection relation among the plurality of the servers, the plurality of network devices, the external disk device, and the one or more logical disks, and
wherein the method comprises:
detecting state information of the first server;

identifying, when a change in configuration indicated by the state information is detected, based on the server information, the first logical disk to which the first server is connected; and identifying, based on the server information, the second server connected to the first logical disk or the second logical disk as a substitute of the first logical disk.

18. The method of claim 16, further comprising:

identifying, based on the server information, the first logical disk to which the first server is connected; and identifying, based on the server information, the second server connected to the first logical disk or the second logical disk as a substitute of the first logical disk.

19. The computer system of claim 4, wherein the second logical disk as a substitute of the first logical disk stores the same data as that stored in the first logical disk.

20. The computer system of claim 9, wherein the second logical disk as a substitute of the first logical disk stores the same data as that stored in the first logical disk.

* * * * *